(12) United States Patent
Maki et al.

(10) Patent No.: US 10,685,046 B2
(45) Date of Patent: Jun. 16, 2020

(54) DATA PROCESSING SYSTEM AND DATA PROCESSING METHOD

(71) Applicant: HITACHI, LTD., Tokyo (JP)

(72) Inventors: Nobuhiro Maki, Tokyo (JP); Kenta Shiga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 232 days.

(21) Appl. No.: 15/739,028

(22) PCT Filed: Mar. 28, 2016

(86) PCT No.: PCT/JP2016/059846
§ 371 (c)(1),
(2) Date: Dec. 21, 2017

(87) PCT Pub. No.: WO2017/168499
PCT Pub. Date: Oct. 5, 2017

(65) Prior Publication Data
US 2018/0225362 A1 Aug. 9, 2018

(51) Int. Cl.
*G06F 16/31* (2019.01)
*G06F 16/33* (2019.01)
*G06F 3/06* (2006.01)
*G06F 12/0873* (2016.01)
*G06F 16/25* (2019.01)

(52) U.S. Cl.
CPC ............ *G06F 16/31* (2019.01); *G06F 3/065* (2013.01); *G06F 3/0607* (2013.01); *G06F 3/0665* (2013.01); *G06F 3/0689* (2013.01); *G06F 12/0873* (2013.01); *G06F 16/254* (2019.01); *G06F 16/334* (2019.01); *G06F 2212/1056* (2013.01); *G06F 2212/2515* (2013.01); *G06F 2212/262* (2013.01); *G06F 2212/312* (2013.01); *G06F 2212/466* (2013.01)

(58) Field of Classification Search
USPC ........................................ 707/768, 802, 741
See application file for complete search history.

(56) References Cited

U.S. PATENT DOCUMENTS 5,819,292 A 10/1998 Hitz et al.
2009/0240737 A1* 9/2009 Hardisty ................ G06F 16/10
(Continued)

FOREIGN PATENT DOCUMENTS

| JP | 2010-073095 A | 4/2010 |
| JP | 2012-212389 A | 11/2012 |
| JP | 2015-515034 A | 5/2015 |

OTHER PUBLICATIONS

International Search Report dated Jun. 21, 2016 for the International Application No. PCT/JP2016/059846.

*Primary Examiner* — Hung T Vy
(74) *Attorney, Agent, or Firm* — Volpe and Koenig, P.C.

(57) ABSTRACT

First type metadata is associated with unstructured data included in an unstructured data source. A data processing system performs an extraction process. This extraction process includes: (a) creating, for each of a plurality of selected pieces of unstructured data in the unstructured data source, second type metadata, which is metadata including content information representing one or more content attributes of the piece of unstructured data; and (b) associating the created second type metadata with the first type metadata of the piece of unstructured data.

12 Claims, 16 Drawing Sheets

(56) References Cited

U.S. PATENT DOCUMENTS

| | | |
|---|---|---|
| 2010/0070538 A1* | 3/2010 | Spinelli .................. G06Q 10/10 707/802 |
| 2010/0077158 A1 | 3/2010 | Asano et al. |
| 2010/0145984 A1* | 6/2010 | Palaniappan .......... G06Q 10/10 707/769 |
| 2013/0262756 A1 | 10/2013 | Goodman et al. |
| 2013/0290248 A1 | 10/2013 | Fukatani et al. |
| 2014/0006355 A1 | 1/2014 | Kirihata |

* cited by examiner

C-metadata 83

C-metadata management information 1230

| | | |
|---|---|---|
| 123001 | C-metadata ID | Cmeta1 |
| 123002 | Type | PICTURE, LOCATION |
| 123003 | Start address | VOL1:EXTENT3 |
| 123004 | End address | VOL1:EXTENT4 |
| 123005 | S-metadata attribute ID | SATTR1 |
| 123006 | User extension | Positional information (Japan, Tokyo) |

Copy pair management table 1260

| Route ID | Copy state | Copy target storage ID | Copy target route ID | Group ID |
|---|---|---|---|---|
| 12601 | 12602 | 12603 | 12604 | 12605 |

DATA PROCESSING SYSTEM AND DATA PROCESSING METHOD

TECHNICAL FIELD

The present invention generally relates to data processing.

BACKGROUND ART

Data managed by a storage system may be used in various applications such as search and analysis.

For example, in big-data analysis, analysis of unstructured data in which a storage structure of files and the like is yet to be determined is anticipated as a potentially useful method of obtaining new findings and realizations in business. In big-data analysis, in order to prevent situations where searches take time due to analyzing a large amount of data and completing the analysis becomes a much time-consuming process, a set made up of only data necessary for analysis may be created from the large amount of data. A set made up of only necessary data is referred to as a "data mart" (hereinafter, DM) and creating the data set is referred to as a "DM creation process".

Generally, in big-data analysis, a DM creation process takes a large amount of time. This is because a process of duplicating (extracting) data necessary for data analysis from a large amount of data and storing the duplicated (extracted) data in the DM is time consuming. PTL 1 discloses a technique that enables data to be duplicated in a short period of time by presenting source data to a host computer as virtually-duplicated snapshot data.

CITATION LIST

Patent Literature

[PTL 1]
U.S. Pat. No. 5,819,292

SUMMARY OF INVENTION

Technical Problem

However, with the technique disclosed in PTL 1, in order to present snapshot data to the host computer, an address of a data source such as a source volume must be designated. It is difficult to apply a snapshot creation technique that requires such addressing to a process of creating a DM from an unstructured data source (for example, a source storing a large amount of unstructured data).

Such a problem is not limited to a process of creating a DM from an unstructured data source for analysis purposes and may also occur in a process of creating a data set (a subset) from an unstructured data source for applications other than analyses.

Solution to Problem

First type metadata is associated with unstructured data included in an unstructured data source. A data processing system executes an extraction process. The extraction process includes, for each piece of corresponding unstructured data in the unstructured data source: (a) creating second type metadata being metadata including content information representing one or more content attributes of the piece of unstructured data; and (b) associating the created second type metadata with the first type metadata of the piece of unstructured data.

Advantageous Effects of Invention

A virtual data set can be created which is constituted by unstructured data referred to by first type metadata associated with second type metadata complying with a condition among a plurality of pieces of second type metadata associated with a plurality of pieces of first type metadata among a plurality of pieces of unstructured data. Therefore, it is expected that a data set can be created in a short period of time.

DESCRIPTION OF EMBODIMENTS

Figure 1:
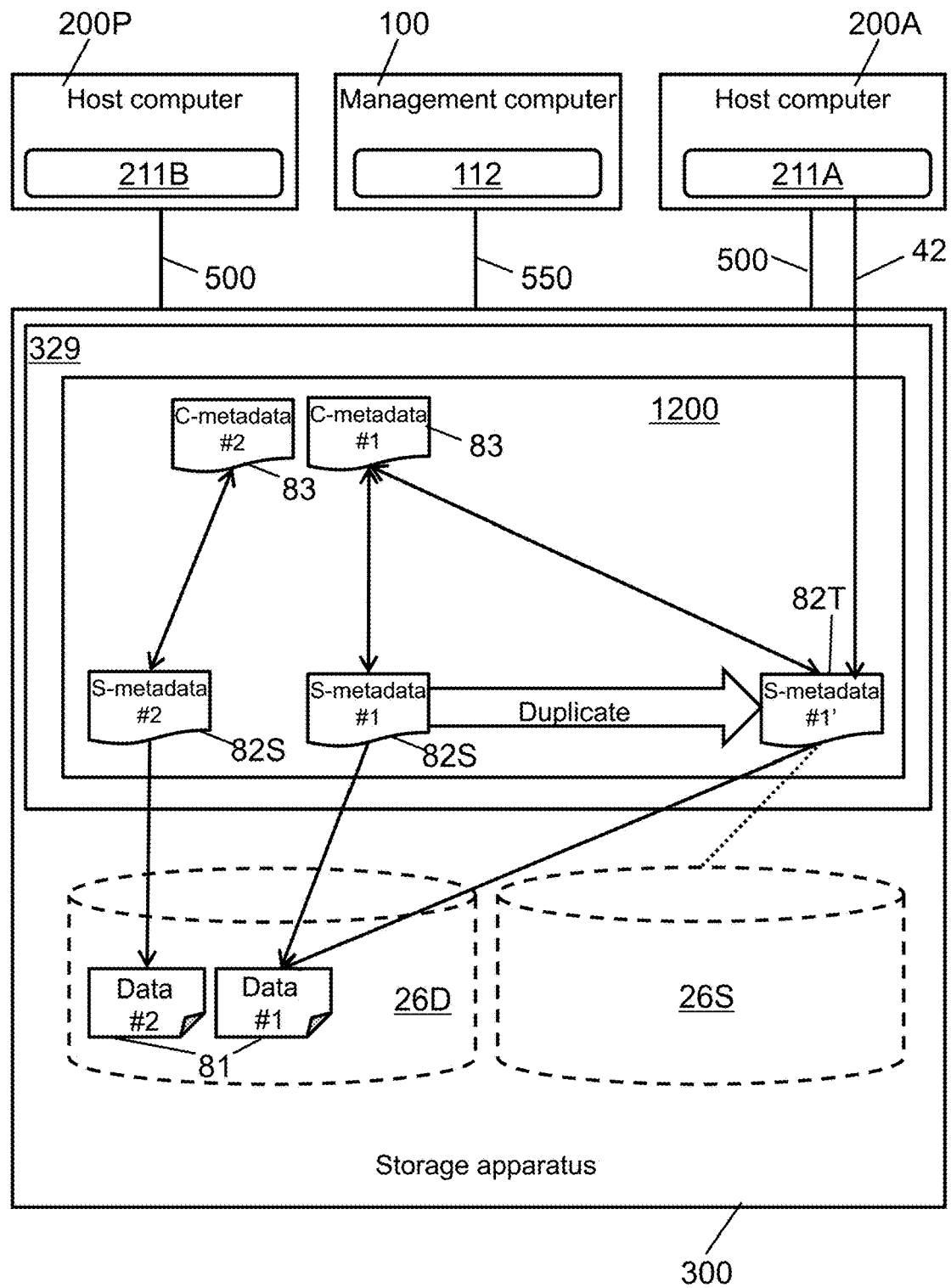
FIG. 1 shows an outline of an embodiment 1.

Hereinafter, several embodiments will be described with reference to the drawings.

Moreover, in the following description, an "interface unit" includes one or more interfaces. The one or more interfaces may be one or more interface devices of a same type (for example, one or more NICs (Network Interface Cards)) or two or more interface devices of different types (for example, an NIC and an HBA (Host Bus Adapter)).

In addition, in the following description, a "storage unit" includes one or more memories. At least one memory may be a volatile memory or a non-volatile memory. The storage unit may include one or more PDEVs in addition to the one or more memories. A "PDEV" refers to a physical storage device and may typically be a non-volatile storage device (for example, an auxiliary storage device). For example, a PDEV may be an HDD (Hard Disk Drive) or an SSD (Solid State Drive).

Furthermore, in the following description, a "processor unit" includes one or more processors. Typically, at least one processor is a CPU (Central Processing Unit). A processor may include a hardware circuit which performs a part of or all of processes.

In addition, while a "program" is sometimes used as a subject when describing a process in the following description, since a program causes a prescribed process to be performed while using at least one of a storage unit and an interface unit as appropriate by being executed by a processor unit, the processor unit (or a computer or a computer system including the processor unit) may be used as a subject of a process. The program may be installed to a computer from a program source. The program source may be, for example, a program distribution server or a recording medium that can be read by a computer. In addition, in the following description, two or more programs may be realized as one program or one program may be realized as two or more programs.

Furthermore, although information will be described below using expressions such as an "xxx table", information may be expressed using any kind of data structure. In other words, an "xxx table" can also be referred to as "xxx information" in order to demonstrate that information is not dependent on data structure. In addition, in the following description, a configuration of each table represents an example and one table may be divided into two or more tables and all of or a part of two or more tables may constitute one table.

In addition, in the following description, when describing elements of a same type without distinguishing the elements from one another, reference signs (or a common portion of reference signs) may be used, but when describing elements of a same type by distinguishing the elements from one another, IDs of the elements (or reference signs of the elements) may be used.

Furthermore, in the following description, a "host system" may be one or more physical host computers (for example, a cluster of host computers) and may include at least one virtual host computer (for example, a VM (Virtual Machine)).

In addition, in the following description, a "management system" may be constituted by one or more computers. Specifically, for example, when a management computer includes a display device and displays information on its own display device, the management computer may constitute a management system. In addition, for example, when a management computer (for example, a server) transmits information to be displayed to a remote display computer (for example, a client) and the display computer displays the information (when a management computer displays information on a display computer), a system at least including the management computer of the management computer and the display computer may constitute a management system.

Furthermore, in the following description, a "storage system" may be one or more physical storage apparatuses and may include at least one virtual storage apparatus (for example, an LPAR (Logical Partition) or an SDS (Software Defined Storage)).

In addition, in the following description, "RAID" stands for a Redundant Array of Independent (or Inexpensive) Disks. A RAID group is constituted by a plurality of PDEVs (typically, PDEVs of a same type) and stores data in accordance with a RAID level associated with the RAID group. A RAID group may also be referred to as a parity group. A parity group may be, for example, a RAID group storing parity.

Furthermore, in the following description, "VOL" is an abbreviation of a logical volume and may be a logical storage device. A VOL may be a real VOL (RVOL) or a virtual VOL (VVOL). An "RVOL" may be a VOL based on a physical storage resource (for example, one or more RAID groups) included in a storage system that provides the RVOL. A "VVOL" may be any one of an externally coupled VOL (EVOL), a capacity expanded VOL (TPVOL), and a snapshot VOL. An EVOL may be a VOL which is based on a storage space (such as a VOL) of an external storage system and which is in accordance with storage virtualization technology. A TPVOL may be a VOL which is constituted by a plurality of virtual areas (virtual storage areas) and which is in accordance with capacity virtualization technology (typically, Thin Provisioning). A snapshot VOL may be a VOL provided as a snapshot of an original VOL. A snapshot VOL may be an RVOL. A "pool" may be a logical storage area (for example, a set of a plurality of pool VOLs). For example, pools may include at least one type of a TP pool and a snapshot pool. A TP pool may be a storage area constituted by a plurality of real areas (real storage areas). When a real area is not allocated to a virtual area (a virtual area of a TPVOL) to which belongs an address designated by a write request received by a storage system (for example, a storage controller to be described later) from a host system, a real area may be allocated to the virtual area (a write destination virtual area) from a TP pool (a real area may be newly allocated to a write destination virtual area even when another real area is already allocated to the write destination virtual area). The storage system may write write target data accompanying the write request to the allocated real area. A snapshot pool may be a storage area in which data saved from an original VOL is stored. One pool may be used as a TP pool and a snapshot pool. A "pool VOL" may be a VOL that is a component of a pool. A pool VOL may be an RVOL or an EVOL.

Embodiment 1

FIG. 1 shows an outline of an embodiment 1.

A computer system according to the embodiment 1 includes one or more host computers 200, a management computer 100, and a storage apparatus 300. The host computer 200 is coupled to the storage apparatus 300 via a network 500. The management computer 100 is coupled to the storage apparatus 300 via a network 550.

The host computer 200 executes an application program (hereinafter, an application) 211. For example, a host computer 200P executes a business application 211B and a host computer 200A executes an analytical application 211A. The management computer 100 executes a management program 112.

The storage apparatus 300 is an object storage apparatus and includes a storage controller 329. The storage controller 329 includes a local memory 1200 and provides a VOL 26. Types of the VOL 26 at least include a data VOL 26D. The data VOL 26D is an example of a data source (typically, an unstructured data source) such as a name space or a DWH (Data Ware House). A data chunk 81 is stored in the data VOL 26D. In the present embodiment, a "data chunk" refers to a significant unit of data (for example, a still image, a moving image, or an E mail). For example, a data chunk may be a portion of time-series data including data from a sensor (for example, data of each certain time). One or more data chunks 81 of which prescribed data attributes are common, are included in a same object. In the present embodiment, an "object" is a data set including one or more data chunks 81 and one piece of S-metadata 82 corresponding to the one or more data chunks 81. For example, when the data chunk 81 is data from a data issuer (for example, a sensor of a camera or the like), each piece of data from a same data issuer is a "data chunk" and a plurality of data chunks from the same data issuer (a plurality of data chunks sharing a data attribute "issuer") are included in a same "object". In the present embodiment, "unstructured data" may be data including at least one data chunk in an object. Moreover, "unstructured data" may be a concept including so-called semi-structured data. Hereinafter, one or more data chunks included in an object may be referred to as a "data chunk unit" or "object data". "Unstructured data" may be each data chunk in an object, a part of the data chunks in an object, or a data chunk unit (object data) in an object.

In the present embodiment, there exist two types of metadata. At least a part of the two types of metadata is stored in the local memory 1200. In the present embodiment, the two types of metadata will be referred to as "S-metadata" and "C-metadata". The S-metadata 82 (or S-metadata attribute information 1220 to be described later corresponding to one data chunk) is an example of first type metadata and the C-metadata 83 is an example of second type metadata. In the present embodiment, the S-metadata 82 and an object correspond to each other one to one. Therefore, the S-metadata 82 and the data chunk 81 correspond to each other one to one or one to many. On the other hand, the C-metadata 83 and the data chunk 81 correspond to each other one to one or many to one. This is because an extraction program to be described later may exist for each user and, in such a case, the C-metadata 83 to be created may differ depending on the extraction program even when the data chunk 81 is the same. Therefore, the S-metadata 82 and the C-metadata 83 correspond to each other one to one or one to many. The S-metadata 82 is metadata associated with a data chunk unit (all data chunks 81) included in an object and includes, for example, an S-metadata ID (an object ID) and information representing a storage location of each data chunk 81 included in a corresponding object. On the other hand, C-metadata 83 is metadata including content information representing one or more content attributes specified from the data chunk 81 (data content) extracted from the data VOL 26D. A "content attribute" is an attribute related to a content of data and examples thereof include a data type (for example, an image or an E mail) and a time point (for example, an acquisition time point or an update time point). While content information is information expressed by a text (for example, a character string), the content information may include other types of information (for example, a numerical value representing a feature amount or the like) instead of or in addition to a text. The S-metadata 82 and the C-metadata 83 also mutually hold information indicating a relationship between the S-metadata 82 and the C-metadata 83. Specifically, the C-metadata 83 refers to the S-metadata 82 that refers to the data chunk 81 corresponding to the C-metadata 83, and the S-metadata 82 that is referred to by the C-metadata 83 refers to the C-metadata 83. In other words, the C-metadata 83 and the S-metadata 82 corresponding to the same data chunk 81 refer to each other. Moreover, instead of such a two-way reference (linking), a one-way reference from the C-metadata 83 to the S-metadata 82 may be adopted. Since the C-metadata 83 is a type of metadata of the data chunk 81, a data amount of the C-metadata 83 is smaller than that of the data chunk 81. In addition, correspondence between the S-metadata 82 and an object is not limited to one to one (for example, the correspondence may be many to many or one to many).

The host computer 200 issues an I/O (Input/Output) request to the storage apparatus 300. The I/O request is a write request or a read request. When the I/O request is a read request, an object ID corresponding to the data chunk 81 that is a read target is designated. For example, when the storage controller 329 receives a read request from the host computer 200A, the storage controller 329 specifies the S-metadata 82 in which the object ID designated by the read request is described, reads the data chunk 81 indicated by the specified S-metadata 82 from the data VOL 26D, and sends back the data chunk 81 to the host computer 200A.

The storage controller 329 executes a DM creation process. The DM creation process is started in response to a user request that is a request of a specific type from a user. The user request may be an explicit request for DM creation or may be a request defined as one type of a DM creation request such as a search request. In the present embodiment, the storage controller 329 accepts a search request from a user (for example, an analyst) of the host computer 200 and accepts a DM creation request from a user (for example, an administrator) of the management computer 100. In the user request, a search condition (a condition related to data to be included in a DM) in accordance with an analytical viewpoint or the like is designated. As the search condition, for example, a condition may be adopted with respect to at least one of a data type (for example, a photograph or an Email), a data issuer (for example, a sensor model number), a position (for example, a data acquisition position such as a photography position), a time slot (for example, a time slot such as a photography time point), and a data value range (for example, an upper limit and a lower limit of metric values included in data).

As the search condition, normally, an address of an area (for example, a VOL area) in which the data chunk 81 is actually stored is not designated. This is because the user is normally unaware of such addresses.

However, the DM creation process according to the present embodiment is expected to be completed in a short period of time due at least (reason 3) among (reason 1) to (reason 3) described below.

(Reason 1) In the DM creation process, the C-metadata 83 is referred to but the data chunk 81 in the data VOL 26D is not referred to.

(Reason 2) The C-metadata 83 referred to in the DM creation process is the C-metadata 83 created asynchronously from the DM creation process (for example, the C-metadata 83 created before starting the DM creation process). In other words, the C-metadata 83 is created at a different timing from a user request that is a timing at which the DM creation process is started. For example, when the data chunk 81 is stored in the data VOL 26D, the C-metadata 83 of the data chunk 81 is created.

(Reason 3) The data chunk 81 need not be duplicated to create a DM. In other words, the DM to be created is not a real DM to store a duplicate of the data chunk 81 in the data VOL 26D but a virtual DM (hereinafter, a VDM) which refers to the data chunk 81 in the data VOL 26D. In the present embodiment, a VDM is an SSVOL (a snapshot VOL) 26S. Creating the SSVOL 26S only requires that first S-metadata 82S be duplicated and the data chunk 81 itself need not be duplicated. Moreover, since the data chunk 81 included in a VDM is not necessarily a reference destination data chunk 81 of all S-metadata 82, second S-metadata 82T that is metadata based on a duplicate of the first S-metadata 82S may not completely match the first S-metadata 82. The first S-metadata 82S is original metadata included in an object and, as described above, the second S-metadata 82T is metadata based on a duplicate of the first S-metadata 82S.

The first S-metadata 82S is an example of first first type metadata and the second S-metadata 82T is an example of second second type metadata. In other words, in the present embodiment, the first S-metadata 82S and the second S-metadata 82T are provided as the S-metadata 82. Moreover, since the second S-metadata 82T is data holding information related to a snapshot data chunk (of which an entity is a data chunk in the data VOL 26D) which is a data chunk that can be referred to through the SSVOL 26S, an expedient name such as metadata need not necessarily be used and, for example, the second S-metadata 82T may be given a different name such as snapshot management data (in this case, since any confusion may be avoided, first S-metadata may be simply referred to as "S-metadata" or "metadata").

Based on the reasons given above, hereinafter, DM creation according to the present embodiment will be referred to as "C-snap" and a DM creation process will be referred to as a "C-snap process". Moreover, a DM is an example of a data set and a VDM is an example of a virtual data set.

According to the example shown in FIG. 1, for example, asynchronously from a search request 42 from the analytical application 211A (the host computer 200A) (for example, before a C-snap is started in response to the search request 42), the storage controller 329 creates pieces of C-metadata #1 and #2 respectively corresponding to data chunks #1 and #2 in the data VOL 26D and stores the created pieces of C-metadata #1 and #2 in the local memory 1200. The C-metadata #1 refers to first S-metadata #1 that refers to the data chunk #1, and the C-metadata #2 refers to first S-metadata #2 that refers to the data chunk #2.

According to the example shown in FIG. 1, the storage controller 329 starts a C-snap in response to the search request 42. A C-snap process is roughly divided into two: "C-snap (selection)" and "C-snap (snapshot acquisition)". In C-snap (selection), the storage controller 329 searches for C-metadata 83 complying with the search condition designated in the search request 42 from the existing pieces of C-metadata #1 and #2. In other words, the C-metadata 83 instead of the data chunk 81 is a search range. When at least one piece of C-metadata 83 complying with the search condition is found, C-snap (snapshot acquisition) is executed. It is assumed that the C-metadata #1 is found. In C-snap (snapshot acquisition), the storage controller 329 creates second S-metadata #1' based on a duplicate of first S-metadata #1 that is referred to by the C-metadata #1, and creates an SSVOL 26S (VDM) to which the second S-metadata #1' belongs. The storage controller 392 provides at least the host computer 200A (a transmission source of the search request 42) among the one or more host computers 200 with the SSVOL 26S. The analytical application 211A (the host computer 200A) can execute an analysis using the data chunk 81 referred to by the second S-metadata #1' belonging to the SSVOL 26S. Moreover, as an access state (an access restriction) of the data chunk 81 referred to by the SSVOL 26S, for example, any of "R/W enabled" (both read and write are enabled), "RO" (read only (only read is enabled)), and "R/W disabled" (both read and write are disabled) may be adopted. For example, at least one of the following may be adopted.

(V1) When a destination to be provided with the SSVOL 26S is a plurality of host computers 200, the access state of the SSVOL 26S may be set to "RO". Accordingly, consistency of data can be maintained among the plurality of host computers 200.

(V2) When the host computer 200A is the only destination to be provided with the SSVOL 26S, the access state of the SSVOL 26S may be set to "R/W". Accordingly, the host computer 200A can customize the SSVOL 26S. For example, when the storage controller 392 receives a write request designating the SSVOL 26S, a data chunk accompanying the write request may be stored in a pool.

As described above, since a C-snap process does not require a duplicate of the data chunk 81, it is expected that the C-snap process can be finished in a short period of time.

Hereinafter, the present embodiment will be described in detail.

Figure 2:
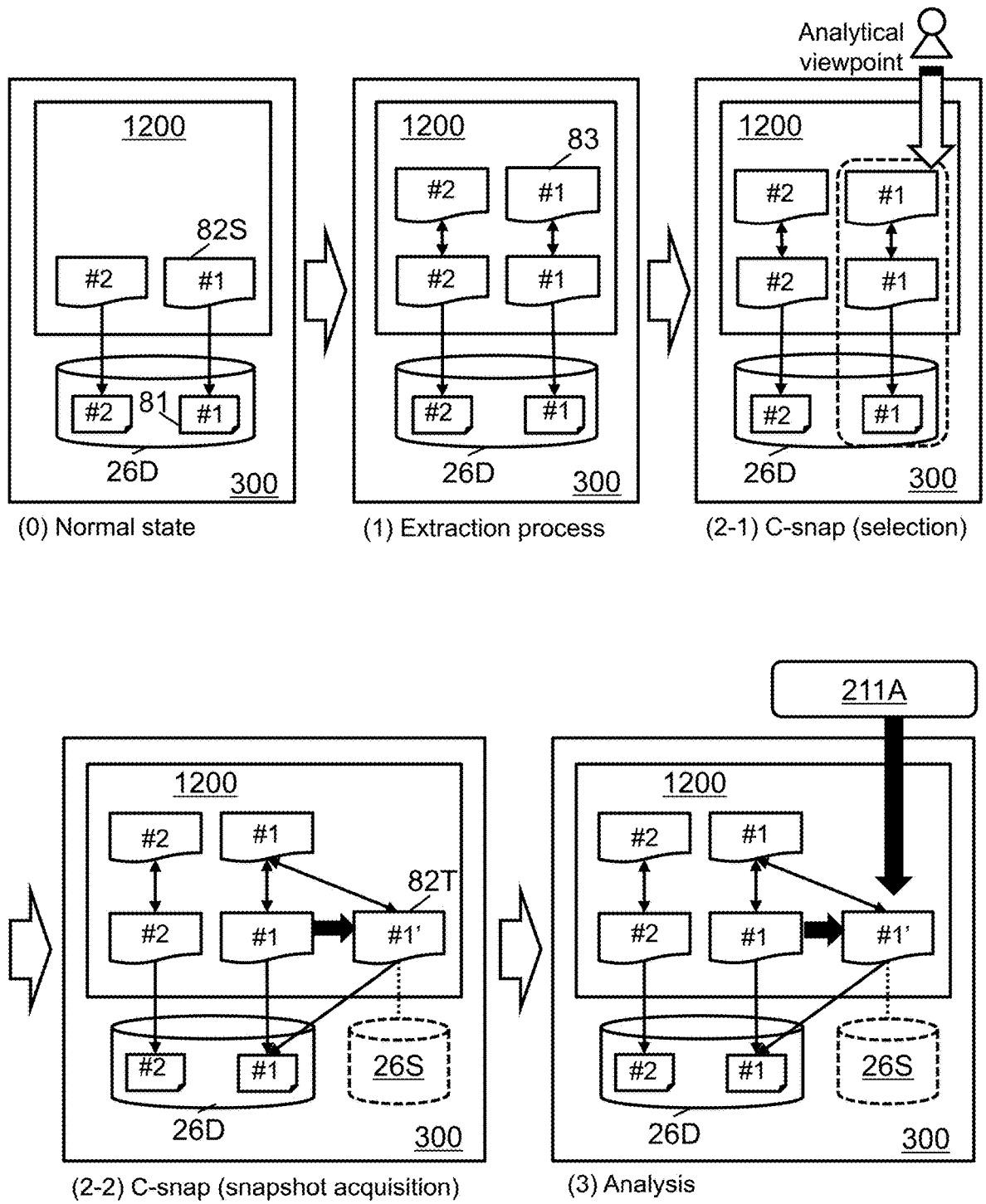
FIG. 2 shows an outline of an example of a series of processes including a C-snap process and processes before and after the C-snap process.

FIG. 2 shows an outline of an example of a series of processes including a C-snap process and processes before and after the C-snap process.

According to the example shown in FIG. 2, "(0) normal state" and "(1) extraction process" precede the C-snap process. The "(0) normal state" is a state before the C-metadata 83 is created. In the "(1) extraction process", the C-metadata 83 is created. The C-metadata 83 refers to the first S-metadata 82S.

The C-snap process is roughly divided into two processes which are, specifically, "(2-1) C-snap (selection)" and "(2-2) C-snap (snapshot acquisition)".

As described earlier, "(3) analysis" is performed after the C-snap process.

A detailed description of FIG. 2 will be given later.

Figure 3:
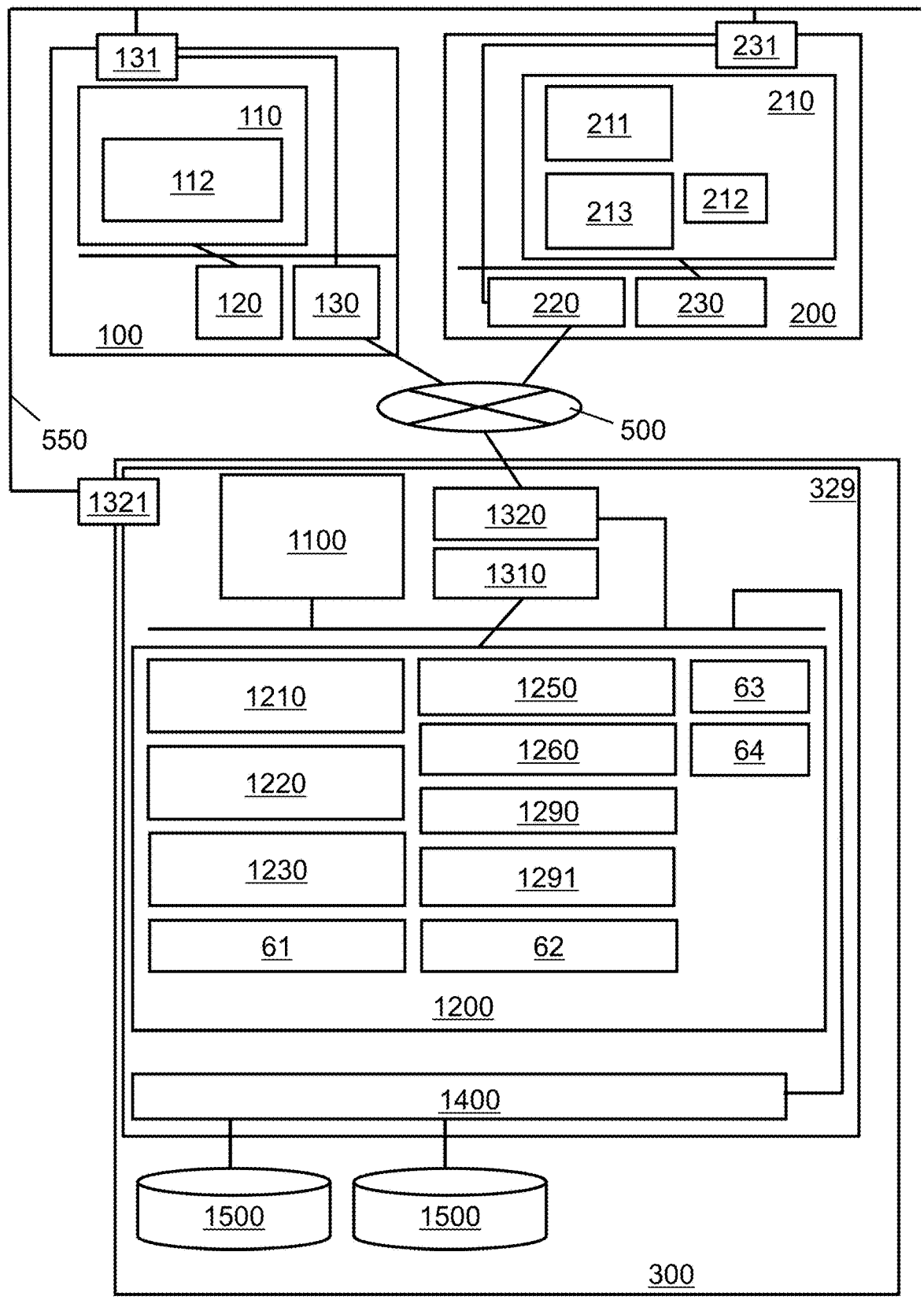
FIG. 3 is a block diagram of a computer system according to the embodiment 1.

FIG. 3 is a block diagram of a computer system according to the embodiment 1.

As described earlier, the computer system includes the management computer 100, the host computer 200, and the storage apparatus 300. One or more of any of the management computer 100, the host computer 200, and the storage apparatus 300 may be provided. The management computer 100 is an example of a management system. The host computer 200 is an example of a host system. The storage apparatus 300 is an example of a storage system.

The management computer 100, the host computer 200, and the storage apparatus 300 are coupled to one another via a network (for example, a LAN (Local Area Network)) 500. In addition, the management computer 100 is coupled to the host computer 200 and the storage apparatus 300 via a network (for example, a SAN (Storage Area Network)) 550. The networks 500 and 550 may be integrated.

The management computer 100 includes an I/F (interface) 131, an I/F 130, a memory 110, and a processor 120 coupled to these components. The I/F 131 and the I/F 130 are examples of the interface unit. The I/F 131 is coupled to the network 550. The I/F 130 is coupled to the network 500. The memory 110 stores the management program 112. By executing the management program 112, the processor 120 can issue a request to the storage apparatus 300. Moreover, the request may be a write request, a read request, a copy control request, and the like.

The host computer 200 includes an I/F 231, an I/F 230, a memory 210, and a processor 220 coupled to these components. The I/F 231 and the I/F 230 are examples of the interface unit. The I/F 231 is coupled to the network 550. The I/F 230 is coupled to the network 500. The memory 210 stores programs such as an OS (Operating System) 212, an application 211, and an agent program 213. The processor 220 executes programs in the memory 210. For example, by executing a program, the processor 220 transmits an I/O request to the storage apparatus 300. Accordingly, the VOL 26 provided by the storage apparatus 300 can be accessed.

The application 211 is, for example, an analytical application. For example, the analytical application performs an analytical process such as correlation analysis. The OS 212 provides overall control of processes performed by the host computer 200. The agent program 213 transmits an instruction to the management computer 100, and the management computer 100 can transfer the instruction to the storage apparatus 300. When the analytical application 211 desires to use a storage function, storage control in conjunction with an analytical process can be provided via the management program 112 by using the agent program 213. For example, when the analytical application includes a DM creation function, in response to a DM creation operation by a user, the agent program 213 transmits a content of the operation to the management program 112, and the management program 112 converts the content of the operation into a copy control request and transmits the copy control request to the storage apparatus 300.

The storage apparatus 300 includes one or more PDEVs 1500 and the storage controller 329 coupled thereto.

The one or more PDEVs 1500 may constitute one or more RAID groups. The PDEV 1500 is, for example, an HDD or an SSD. The data chunk 81 stored in the data VOL 26D or the like is stored in the one or more PDEVs 1500. At least a part of the plurality of pieces of C-metadata 83 and the plurality of pieces of S-metadata 82 may be stored in the one or more PDEVs 1500.

The storage controller 329 includes an I/F 1321, an I/F 1320, an I/F 1400, a cache memory 1100, the local memory 1200, and a processor 1310 coupled to these components. The local memory 1200 stores information and programs. By executing programs in the local memory 1200, the processor 1310 refers to or updates information in the local memory 1200, performs an I/O on a VOL, creates the C-metadata 83, executes a C-snap.

The I/F 1321, the I/F 1320, and the I/F 1400 are examples of the interface unit. The I/F 1321 is coupled to the network 550. The I/F 1320 is coupled to the network 500. The I/F 1400 is coupled to the one or more PDEVs 1500.

The cache memory 1100 and the local memory 1200 are examples of the storage unit. The cache memory 1100 and the local memory 1200 may be one memory and a cache area as a cache memory and a local memory area as a local memory may be provided in the memory.

The cache memory 1100 is a memory for temporarily storing data input to or output from the one or more PDEVs 1500 (for example, data (write target data or read target data) in accordance with an I/O request from the host computer 200).

The local memory 1200 stores information and programs. Specifically, for example, the local memory 1200 stores S-metadata management information 1210, S-metadata attribute information 1220, C-metadata management information 1230, a storage management table 1250, and a copy pair management table 1260. In addition, for example, the local memory 1200 stores an I/O program 61, an object program 62, a data processing program 63, a snapshot program 64, an extraction program 1290, and a C-snap program 1291.

The S-metadata management information 1210 and the S-metadata attribute information 1220 exist for each piece of S-metadata 82. The S-metadata management information 1210 is information for managing an object. The S-metadata attribute information 1220 is information for managing the data chunk 81.

The C-metadata management information 1230 exists for each piece of C-metadata 83. The C-metadata 83 includes content information representing one or more content attributes specified from the data chunk 81. The C-metadata management information 1230 is at least a part of the C-metadata 83.

The storage management table 1250 is a table that stores information related to the VOL 26 provided by the storage apparatus 300. The copy pair management table 1260 is a table that stores information related to a copy configuration to which the SSVOL 26S belongs.

The I/O program 61 is a program for processing an I/O request. The object program 62 is a program for processing an object. The data processing program 63 is a program for accessing the VOL 26. The snapshot program 64 is a program for creating the SSVOL 26S.

The extraction program 1290 is a program for extracting a data chunk 81 and creating C-metadata 83 based on the extracted data chunk 81. The C-snap program 1291 is a program for executing a C-snap process. At least one of the extraction program 1290 and the C-snap program 1291 may be a user program that is a program created by the user. In other words, at least one of the extraction program 1290 and the C-snap program 1291 may exist for each user, and at least one of the extraction program 1290 and the C-snap program 1291 corresponding to the user of the host computer 200 may be executed. By adopting a user program as at least one of the extraction program 1290 and the C-snap program 1291, at least one of the C-metadata 83 and the SSVOL 26S (VDM) which enables an analysis result desirable to the user (for example, an analyst) to be obtained can be expected.

Figure 4:
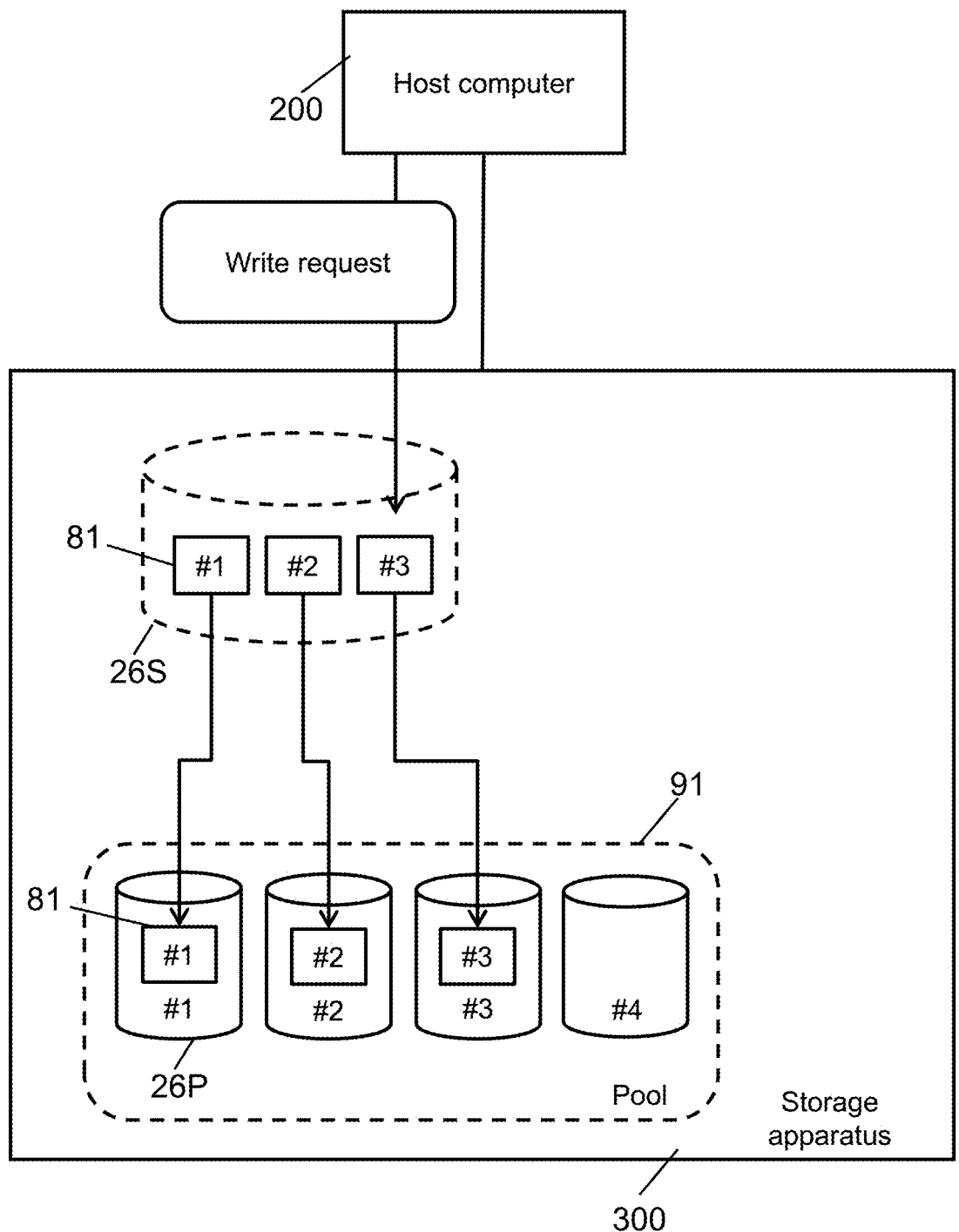
FIG. 4 shows an example of a snapshot process.

FIG. 4 shows an example of a snapshot process.

The snapshot process is a process during write with respect to the SSVOL 26S. The storage controller 329 manages a pool 91 constituted by one or more pool VOLs 26P (pool VOLs #1 to #4).

The storage controller 329 receives a write request designating the SSVOL 26S from the host computer 200. The write request is, for example, a write request designating an object ID of an object including a data chunk that is a reference destination of S-metadata (an S-metadata duplicate) belonging to the SSVOL 26. The storage controller 329 stores the data chunk 81 (for example, #1) in accordance with the write request in the pool 91 instead of the reference destination of the SSVOL 26 (S-metadata). In other words, a write target data chunk 81 is stored in the pool VOL 26P which is an example of a VOL that differs from the reference destination VOL of the SSVOL 26 (S-metadata). The storage controller 329 manages an association between a virtual address of a data chunk (an address of an area of the SSVOL 26S) and a real address of the data chunk 81 (an address of an area of the pool VOL 26P). As described above, a process using a Ridirect-on-write system may be adopted as the snapshot process. In other words, when a write occurs with respect to a data chunk in the SSVOL 26S (or the data VOL 26D), the write is performed on a new area and an area (address) indicated by the first S-metadata 82S and the second S-metadata 82T is rewritten. In this manner, while a snapshot process using the Ridirect-on-write system may be adopted, a snapshot process using another system such as a Copy-on-write system may also be adopted.

Figure 5:
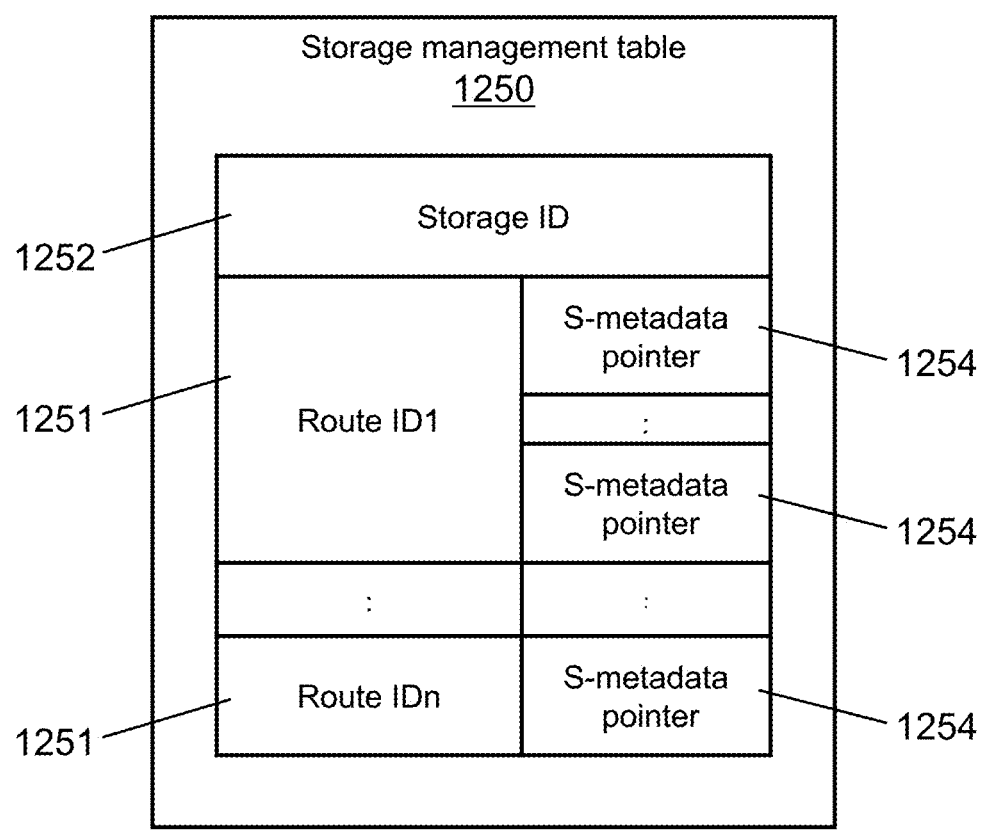
FIG. 5 shows a configuration of a storage management table.

FIG. 5 shows a configuration of the storage management table 1250.

The storage management table 1250 includes a storage ID 1252. One or more route IDs 1251 are included for each storage ID 1252.

The storage ID 1252 is information representing an identifier (a storage ID) of the storage apparatus 300.

The route ID 1251 is information representing an identifier (a route ID) of a route. The route ID 1251 of a route included in the storage apparatus 300 is associated with the storage ID 1252 of the storage apparatus 300. In the present embodiment, a "route" refers to a group of one or more pieces of S-metadata 82. The VOL 26 exists for each route. Therefore, for example, a route ID can also be described an identifier of a VOL (a VOL_ID). An S-metadata pointer 1254 of the S-metadata 82 belonging to a route is associated with the route ID 1251 of the route. The S-metadata pointer 1254 is information (a pointer) indicating the whereabouts of the S-metadata 82 in the local memory 1200.

Figure 6:
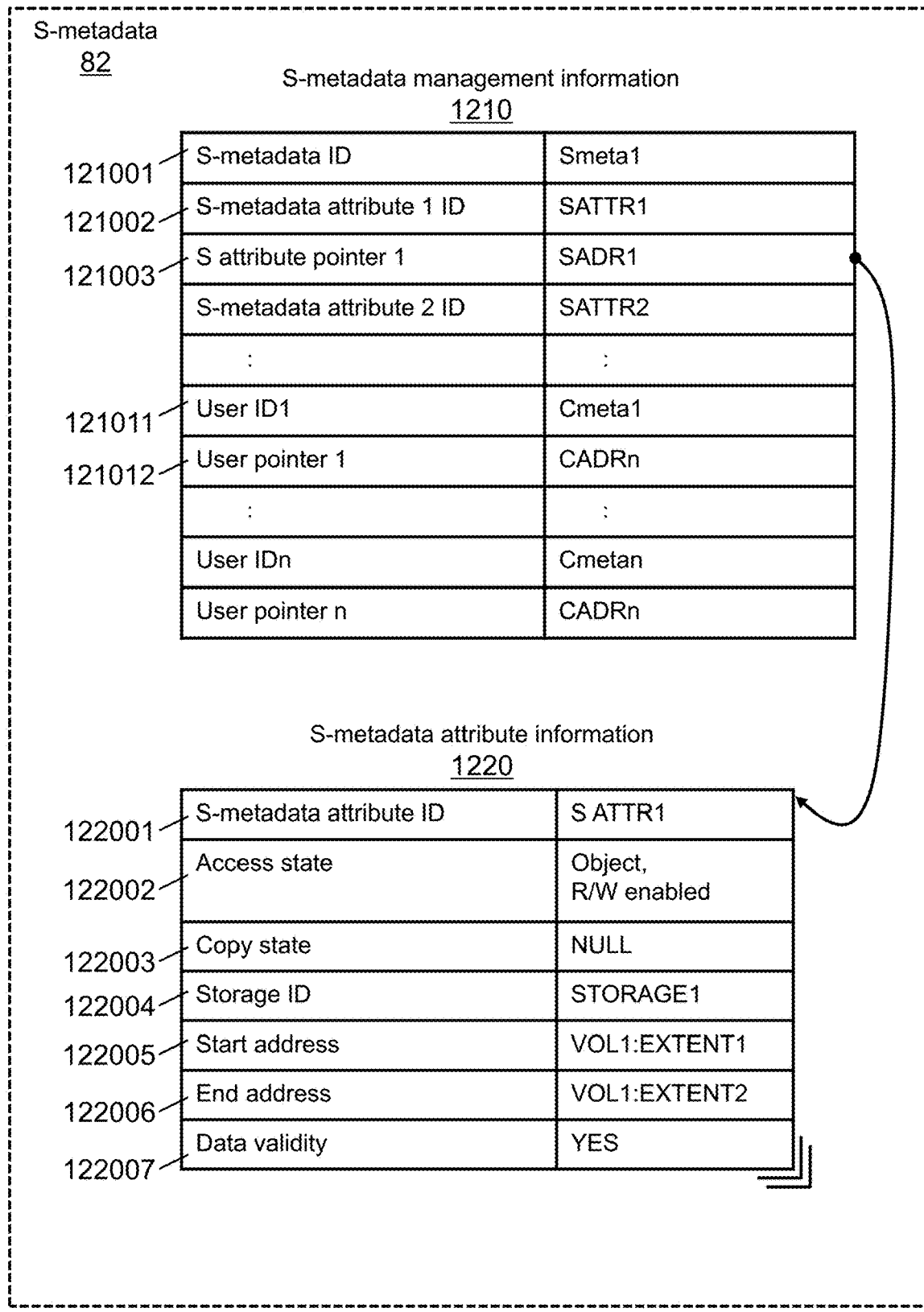
FIG. 6 shows configurations of S-metadata management information and S-metadata attribute information included in one piece of S-metadata.

FIG. 6 shows configurations of S-metadata management information 1210 and S-metadata attribute information 1220 included in one piece of S-metadata 82.

The S-metadata 82 is constituted by the S-metadata management information 1210 and the S-metadata attribute information 1220. As described above, the S-metadata management information 1210 manages an object and the S-metadata attribute information 1220 manages the data chunk 81. With the S-metadata management information 1210, the S-metadata attribute information 1220 is associated with each data chunk 81 in an object corresponding to the S-metadata management information 1210.

The S-metadata management information 1210 includes an S-metadata ID 121001. The S-metadata ID 121001 is information representing an identifier (an S-metadata ID) of a piece of S-metadata. An S-metadata ID is, in other words, an object ID.

In addition, the S-metadata management information 1210 includes, for each data chunk 81 in a corresponding object, an S-metadata attribute ID 121002 and an S attribute pointer 12103. The S-metadata attribute ID 121002 is information representing an identifier (an S-metadata attribute ID) of the S-metadata attribute information 1220. The S attribute pointer 121003 is information (a pointer) indicating the whereabouts of the S-metadata attribute information 1220 in the local memory 1200. Accordingly, the C-metadata 83 as a reference destination of the S-metadata 82 can be specified.

Furthermore, the S-metadata management information 1210 includes, for each piece of C-metadata 83 that refers to the S-metadata 82 including the S-metadata management information 1210, a user ID 12011 and a user pointer 121012. The user ID 121011 is information representing an identifier (a C-metadata ID) of the C-metadata 83 and specifically, for example, the user ID 121011 is information which is used when managing additional information (in other words, the C-metadata 83) added to the S-metadata management information 1210 by a user program (for example, the extraction program 1290) and which is an identifier of the additional information. The user pointer 121012 is information (a pointer) indicating the whereabouts of the C-metadata management information 1230 included in the C-metadata 83 in the local memory 1200.

The S-metadata attribute information 1220 includes an S-metadata attribute ID 122001, an access state 122002, a copy state 122003, a storage ID 122004, a start address 122005, an end address 122006, and data validity 122007.

The S-metadata attribute ID 122001 is information representing an S-metadata attribute ID. The S-metadata attribute ID may be an identifier of a data chunk (a data chunk ID). In an I/O request, any one of an object ID and a data chunk ID may be designated.

The access state 122002 is information representing an access method and an access restriction to the data chunk 81. Examples of the access method include object access ("Object") which is access in object units, block access which is access in block units, and file access which is access in file units. Examples of the access restriction include "R/W enabled", "RO", and "R/W disabled". The access state 122002 may further include information indicating which user is access-enabled.

The copy state 122003 is information representing a copy state with respect to a data chunk. Examples of the copy state 122003 include "SVOL" (indicating that the data chunk is referred to by the SSVOL 26S) and "NULL" (indicating that the data chunk 81 is not a copy target).

The storage ID 122004 is information representing an identifier (a storage ID) of the storage apparatus 300 in which the data chunk 81 is stored. As in another embodiment to be described later, there may be cases where the data chunk 81 referred to by the S-metadata 82 is arranged in a storage apparatus 300 that differs from the storage apparatus 300 in which the S-metadata 82 exists. By referring to the storage ID 122004, the processor 1310 can specify the storage apparatus 300 storing the corresponding data chunk 81.

The start address 122005 is information representing a start address of an area in which the data chunk 81 exists. The end address 122006 is information representing an end address of the area in which the data chunk 81 exists. The data validity 122007 is information (for example, a flag) representing whether or not the data chunk 81 itself is valid. "YES" means valid and "NO" means invalid. For example, when there is S-metadata # X that refers to data chunks # A and # B in the data VOL 26D and S-metadata # X' (a duplicate of the S-metadata # X) only refers to the data chunk # A among the data chunks # A and # B, in the S-metadata # X', the data validity 12007 corresponding to the data chunk # A is "YES" but the data validity 12007 corresponding to the data chunk # B is "NO".

Figures 7, 8, 9:
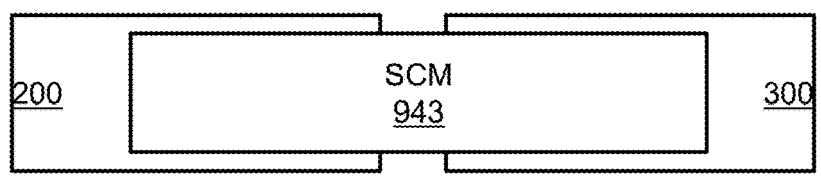
FIG. 7 shows a configuration of C-metadata management information included in one piece of C-metadata.
FIG. 8 shows a configuration of a copy pair management table.
FIG. 9 shows an outline of an embodiment 4.

FIG. 7 shows a configuration of the C-metadata management information 1230 included in one piece of C-metadata 83.

The C-metadata management information 1230 is at least a part of the C-metadata 83. The C-metadata management information 1230 includes a C-metadata ID 123001, a type 123002, a start address 123003, an end address 123004, an S-metadata attribute ID 123005, and a user extension 123006.

The C-metadata ID 123001 is information representing an identifier (a C-metadata ID) of the C-metadata 83. The S-metadata 82 that is a reference destination of the C-metadata 83 (the S-metadata 82 including a same C-metadata ID as the user ID 121011) can be discerned from the C-metadata ID 123001.

The type 123002 is information representing a type of the C-metadata 83. For example, the type 123002 is referred to when the C-snap program 1291 searches from a viewpoint of metadata type.

The start address 123003 is information representing a start address of an area (for example, an area of the VOL 26) storing information associated with the C-metadata management information 1230 (for example, a part of content information (a part of the C-metadata 83)). The end address 123004 is information representing an end address of an area storing information associated with the C-metadata management information 1230. When all C-metadata 83 exist in the local memory 1200, the start address 123003 and the end address 123004 are respectively "NULL".

The S-metadata attribute ID 123005 is information representing an S-metadata attribute ID of the S-metadata attribute information 1220 indicating a data chunk corresponding to the C-metadata 83. The S-metadata attribute information 1220 indicating the data chunk 81 corresponding to the C-metadata 83 can be identified from the S-metadata attribute ID 123005.

The user extension 123006 is extension information added by a user program and is at least apart of content information. For example, when the extracted data chunk 81 is a photographed image, information on a photography position of the image is included in the C-metadata management information 1230 as the user extension 123006.

FIG. 8 shows a configuration of the copy pair management table 1260.

The copy pair management table 1260 is a table that stores information related to a configuration of a copy pair. The copy pair management table 1260 stores a route ID 12601, a copy state 12602, a copy target storage ID 12603, a copy target route ID 12604, and a group ID 12605.

The route ID 12601 is information representing an identifier (a route ID) of a route. The copy state 12602 is information representing a current state of a copy related to a route (for example, a VOL) identified by the route ID 12601. The copy target route ID 12604 is information representing an identifier of a copy target route that is a route constituting a pair with a route represented by the route ID 12601. The copy target route may be any of a copy source and a copy destination. At least one of the route ID 12601 and the copy target route ID 12604 may include information (for example, a symbol) representing whether a route corresponding to the information is a copy source or a copy destination. The group ID 12605 is information representing an identifier (a group ID) of a copy group including the copy pair.

Hereinafter, several processes performed in the embodiment 1 will be described.

Figure 10:
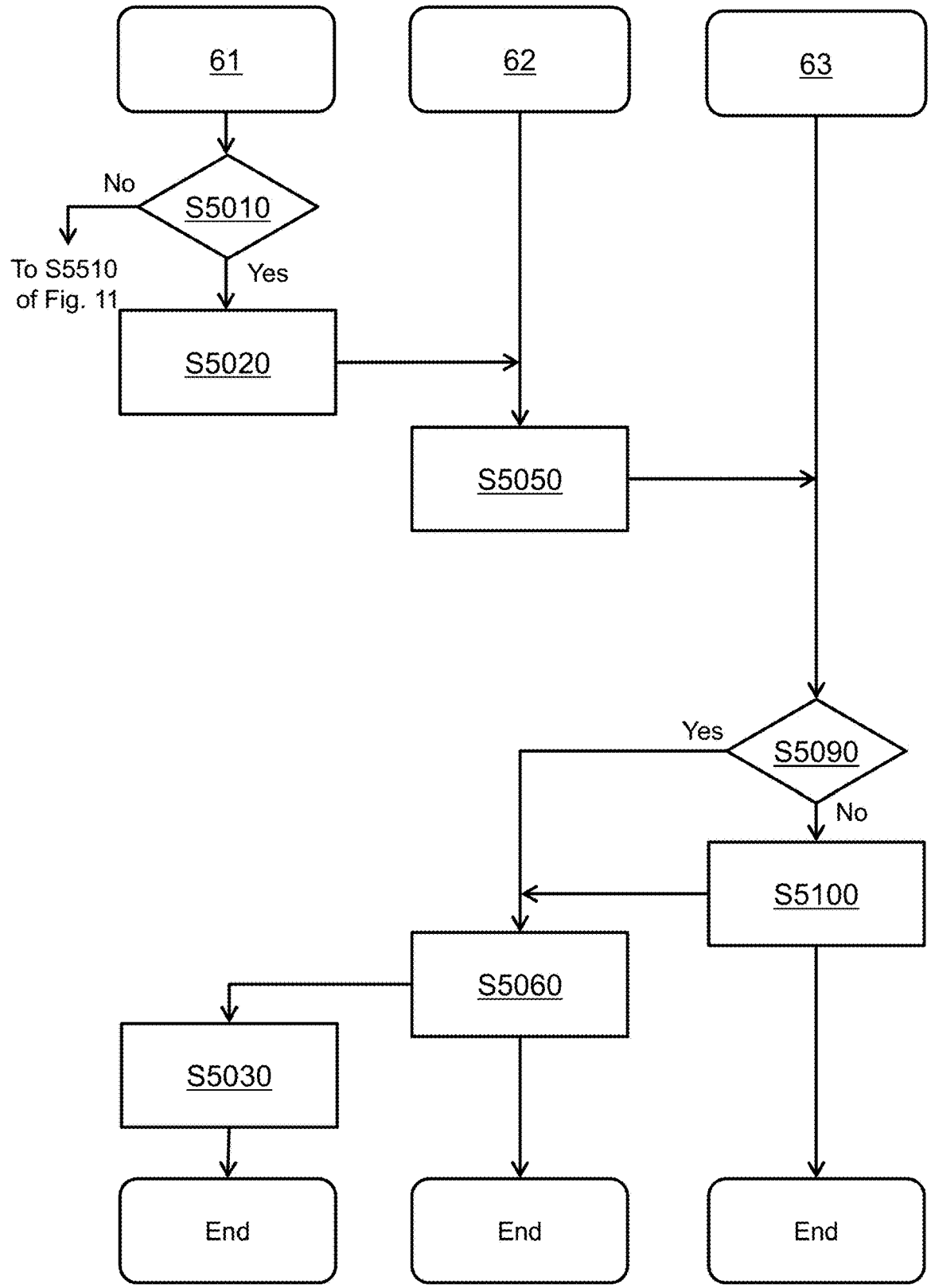
FIG. 10 is a flow chart of a data read process.

FIG. 10 is a flow chart of a data read process.

When the storage apparatus 300 receives an I/O request from the host computer 200, the I/O program 61 determines whether or not the I/O request is a read request (S5010). When a result of the determination of S5010 is false (S5010: No), the I/O program 61 advances to S5510 in FIG. 11.

When a result of the determination of S5010 is true (S5010: Yes), the I/O program 61 converts the read request into a common read request and passes the converted read request to process of the object program 62 (S5020). An I/O request such as a read request is converted into a common I/O request in order to enable various protocols (access methods) to be used as a protocol of the I/O request. For example, given that there are protocols such as blocks, files, and objects, a conversion into a common I/O request enables processing subsequent to the conversion to be commonly performed regardless of the protocol. For example, an object access protocol is an input/output protocol in which data access is performed with an object as a basic unit and which can be operated using a Web interface such as the REST (Representational State Transfer) protocol as an operating format. Specifically, for example, operations can be performed in a format such as PUT <object ID> <write|read|copy control> [<option>] and due to S5020, an I/O request can be converted into a common request in the following common format:

WRITE|READ|COPY <object ID> [<option>].

Next, S5050 is performed. In other words, the object program 62 converts a read source address in accordance with a common read request into an address of a VOL. The S-metadata management information 1210 and the S-metadata attribute information 1220 are used in the conversion. Specifically, the object program 62 refers to the S-metadata management information 1210 including the S-metadata ID 121001 matching the object ID in the common request, and refers to the S-metadata attribute information 1220 from the S attribute pointer 121003 in the S-metadata management information 1210. Next, the object program 62 acquires the start address 122005 and the end address 122006 included in the S-metadata attribute information 1220. The object program 62 converts the object ID in the common request into a start address and an end address represented by the acquired addresses 122005 and 122006, and passes the converted common request to the data processing program 63.

The data processing program 63 determines whether or not data specified from the common request exists in the cache memory 1100 (S5090). When a result of the determination of S5090 is false (S5090: No), the data processing program 63 writes the data into the cache memory 1100 and passes the processing to the object program (S5100).

When a result of the determination of 5090 is true (S5090: Yes) or after S5100, the object program 62 reads the data from the cache memory 1100 (S5060). The I/O program 61 returns the data to the host computer 200 that is a transmission source of the read request (S5030).

As described above, in a data access process in the storage apparatus 300, due to the three programs 61 to 63 running in parallel and cooperating with each other as necessary, data in accordance with a read request can be read from the VOL 26 and returned to the host computer 200. The read source VOL may be the data VOL 26D or the SSVOL 26S. In the data read process, a determination may be made regarding whether or not readout is permitted based on the access state 122002 corresponding to the data chunk 81 that is a read target.

Figure 11:
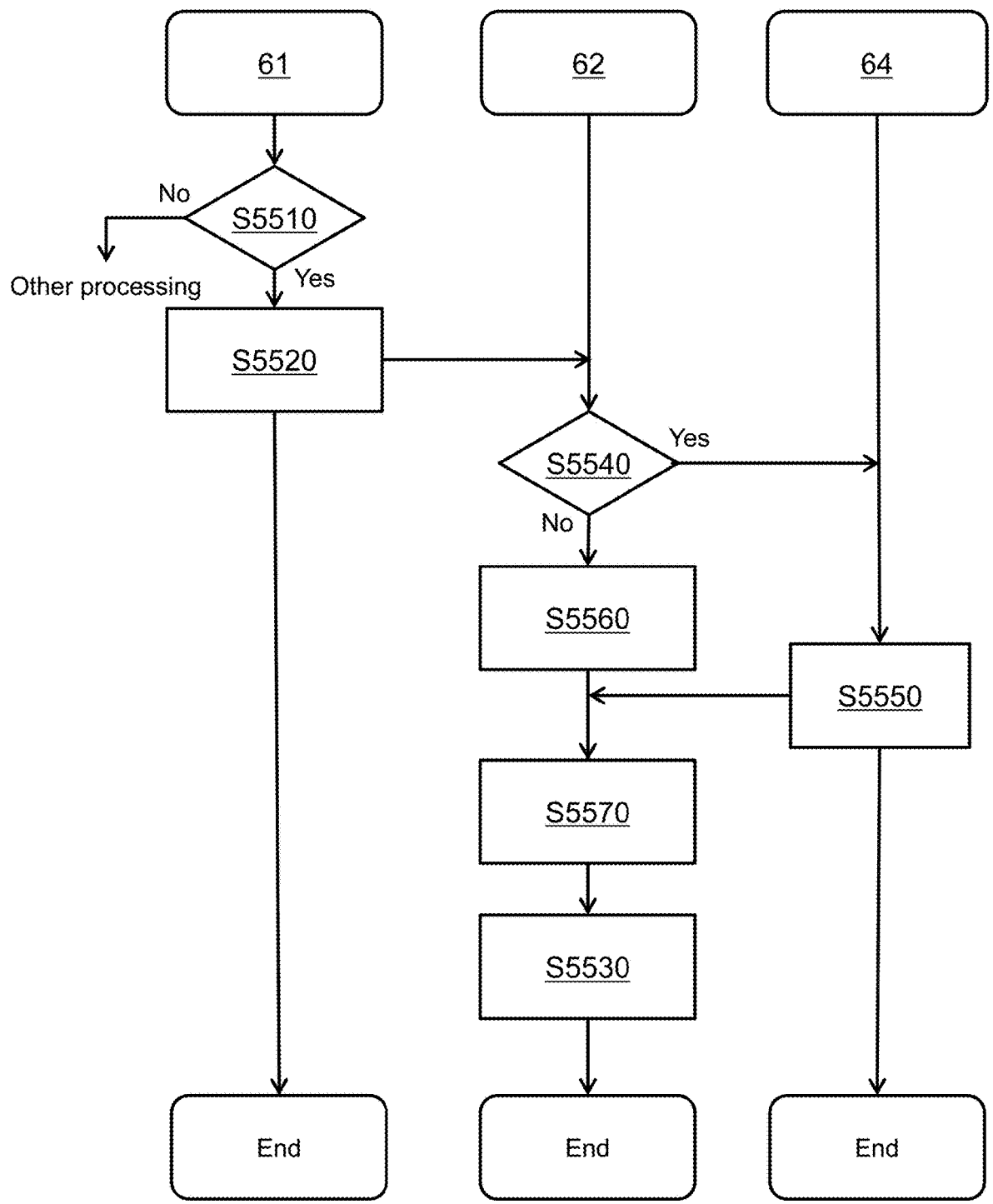
FIG. 11 is a flow chart of a data write process.

FIG. 11 is a flow chart of a data write process.

The I/O program 61 determines whether or not an I/O request is a write request (S5510). When a result of the determination in S5510 is false (S5510: No), a process in accordance with the request is performed.

When the result of the determination in S5510 is true (S5510: Yes), the I/O program 61 converts the write request into a common request of the storage apparatus 300 (S5520).

Next, the object program 62 determines whether or not the copy state 122003 of data (an object) that is a write target in accordance with the common request is "SVOL" (S5540). Specifically, the object program 62 specifies the S-metadata management information 1210 with the same S-metadata ID 121001 as the object ID in the common request, further specifies the S-metadata attribute information 1220 from the S attribute pointer 121003 in the S-metadata management information 1210, and refers to the copy state 122003 of the specified S-metadata attribute information 1220.

When the copy state 122003 is "SVOL" (S5540: Yes), the snapshot program 64 changes a write destination VOL to another VOL (pool VOL) (S5550). Specifically, the snapshot program 64 refers to the S-metadata management information 1210 including the S-metadata ID 121001 matching the object ID in the common request, and refers to the S-metadata attribute information 1220 from the S attribute pointer 121003 in the S-metadata management information 1210. Next, the snapshot program 64 acquires the start address 122005 and the end address 122006 of the S-metadata attribute information 1220, and changes a VOL_ID represented by the addresses 122005 and 122006 to an ID of the pool VOL. Accordingly, a situation where the data chunk 81 referred to by the SSVOL 26S is updated by a write to the SSVOL 26S can be avoided.

When the copy state 122003 is not "SVOL" (S5540: No), S5560 is performed. In other words, the object program 62 converts the object ID in the common request into an address of a VOL. Specifically, the object program 62 refers to the S-metadata management information 1210 including the S-metadata ID 121001 matching the object ID in the common request, and refers to the S-metadata attribute information 1220 from the S attribute pointer 121003 in the S-metadata management information 1210. Next, the object program 62 acquires the start address 122005 and the end address 122006 included in the S-metadata attribute information 1220, and replaces the object ID in the common request with the acquired addresses 122005 and 122006.

After S5550 or S5560, the object program 62 reserves an area in a cache memory 1110 (S5570). In addition, the object program 62 writes data in accordance with the common request to the reserved area (S5530). Once S5530 is completed, the I/O program 61 may return a write completion to the host computer 200 that is a transmission source of the write request. The data written in the cache memory 1110 is written to the PDEV 1500 corresponding to an area indicated by a write destination address of the data by the data processing program 63.

As described above, in a data access process in the storage apparatus 300, due to the three programs 61 to 63 running in parallel and cooperating with each other as necessary, data that is a write request can be written to the cache memory 1100 and the host computer 200 may be notified of a completion. In the data write process, a determination may be made regarding whether or not write is permitted based on the access state 122002 corresponding to the data chunk 81 that is a write target.

Hereinafter, a series of processes including a C-snap process will be described with reference to FIG. 2 and FIGS. 12 to 14.

According to FIG. 2, "(0) normal state" and "(1) extraction process" precede the C-snap process, the C-snap process includes "(2-1) C-snap (selection)" and "(2-2) C-snap (snapshot acquisition)", and "(3) analysis" is performed after the C-snap process.

<(0) Normal State>

The data chunk 81 is stored in the storage apparatus 300 and first S-metadata 82S is associated with an object including the data chunk 81. For example, the data chunk 81 may be image data generated from a monitoring camera or log information output from a piece of manufacturing equipment in a factory.

According to FIG. 2, data chunks #1 and #2 are stored and there are pieces of first S-metadata #1 and #2 that respectively refer to the data chunks #1 and #2.

<(1) Extraction Process>

An extraction program 1290R runs on the processor 1310 at a time point where at least one data chunk 81 is stored in the data VOL 26D of the storage apparatus 300, at a certain time interval, at a time point where a state of low processing load on the processor 1310 has continued for a certain period of time or more, or the like.

Figure 12:
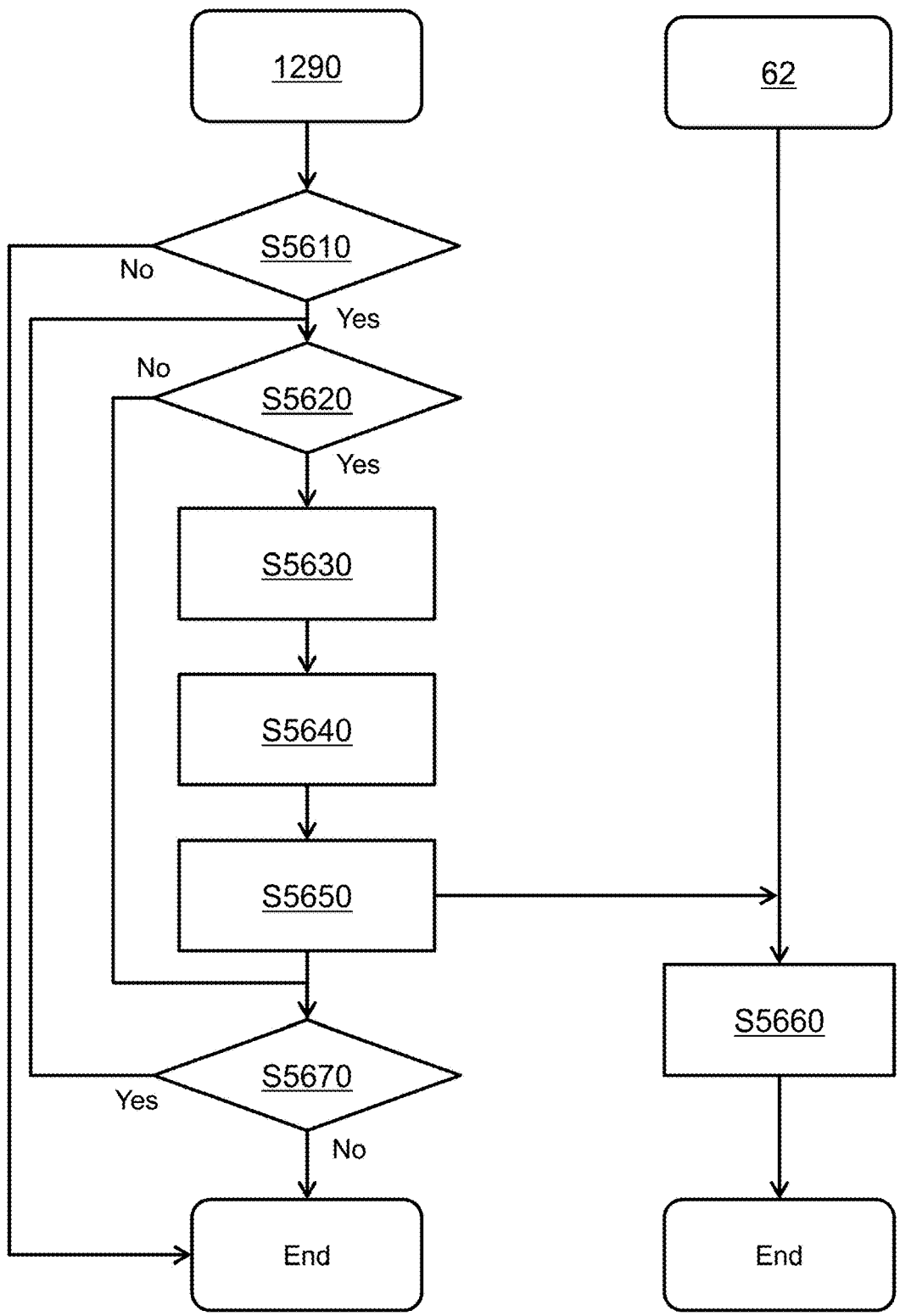
FIG. 12 is a flow chart of an extraction process.

FIG. 12 is a flow chart of the extraction process.

The extraction process is performed by the extraction program 1290 and the object program 62. The extraction process may target a route ID designated by the user. The route ID (for example, a VOL_ID) may be designated in advance. The extraction program 1290 is a program which acquires content information that may constitute an analytical viewpoint from data (an object) stored in the storage apparatus 300, associates C-metadata 83 including the content information with S-metadata 82 of the data, and stores the associated C-metadata 83 in the storage apparatus 300. While the extraction program 1290 runs in the storage apparatus 300 in the present embodiment, the extraction program 1290 may run on any of the host computer 200 and the management computer 100 instead.

By comparing a time point where the data chunk 81 is stored in a designated route (VOL) with a time point of an immediately-previous extraction process, the extraction program 1290 determines whether or not there is a data chunk (hereinafter, an updated data chunk) 81 of which a storage time point is more recent than the time point of the immediately-previous extraction process (S5610). When a result of the determination in S5610 is false (S5610: No), the process is ended. Moreover, "the time point of the immediately-previous extraction process" is a time point where the data chunk 81 has been stored in the local memory 1200 by the extraction program 1290 in the immediately-previous extraction process.

When a result of the determination in S5610 is true (S5610: Yes), the extraction program 1290 extracts the updated data chunk 81 and determines whether or not the extracted updated data chunk 81 is a data chunk that complies with a set extraction rule (S5620). For example, the extraction rule is designated a data condition of a data chunk to be extracted (a search condition for extraction). For example, the data condition may be a data type (for example, a photograph or an E-mail). An extraction rule may be prepared for each user in place of, or in addition to, the extraction program 1290 being prepared for each user.

When a result of the determination in S5620 is false (S5620: No), the extraction program 1290 advances to S5670 (the process may be ended).

When a result of the determination in S5620 is true (S5620: Yes), based on a data format of the updated data chunk 81, the extraction program 1290 extracts, from the updated data chunk 81, content information representing one or more content attributes represented by the updated data chunk 81 (S5630). In order to acquire content information from the updated data chunk 81, a different approach must be employed according to the data type. For example, when acquiring positional information from an image, at least a part of content information can be acquired by referring to attribute information of an image file and reading positional information included in the attribute information.

Next, the extraction program 1290 creates C-metadata 83 based on the extracted content information (S5640). The content information may be stored in at least one of the local memory 1200 and the VOL 26. When a capacity of the content information is sufficiently smaller than a free capacity of the local memory 1200, the entire content information may be stored in the local memory 1200. The extraction program 1290 creates C-metadata management information 1230 based on a storage location of the content information. The C-metadata ID 1230 may have an arbitrary value. The start address 123003 and the end address 123004 may be "NULL" when the content information is stored in the local memory 1200. The S-metadata attribute ID 123005 may be an identifier of an updated data chunk. The user extension 123006 may be at least a part of the content information. In this manner, since at least a part of the content information may be registered in the C-metadata management information 1230, as a result, the entire content information may be stored in the local memory 1200. On the other hand, at least a part of the content information may be stored in the VOL 26. In this case, for example, an address of a storage location of the content information can be obtained by making an inquiry to the object program 62. In addition, when the entire content information is registered in a VOL, the user extension 123006 may be "NULL".

Next, the extraction program 1290 makes a request to the object program 62 to register the C-metadata 83 including the C-metadata management information 1230 created in S5640 (S5650). In response to the request, the object program 62 associates the C-metadata 83 with the S-metadata 82 that refers to the extracted updated data chunk 81 (S5660). Specifically, the object program 62 adds a same value as the C-metadata ID 1230 as the user ID 121011 and adds a pointer to the C-metadata management information 1230 as the user pointer 121012 to the S-metadata management information 1210 in the S-metadata 82 that refers to the extracted updated data chunk 81.

The extraction program 1290 makes a similar determination as S5610 (S5670). When a result of the determination of S5670 is true (S5670: Yes), the extraction program 1290 advances to S5620 with respect to a different updated data chunk. When the result of the determination in S5670 is false (S5670: No), the process is ended.

According to FIG. 2, due to the extraction process, the pieces of C-metadata #1 and #2 respectively corresponding to the data chunks #1 and #2 are created. The C-metadata #1 refers to the first S-metadata #1 and the C-metadata #2 refers to the first S-metadata #2. Moreover, both pieces of C-metadata #1 and #2 may include, as content attributes, a designated search condition (a data condition (for example, a time slot)) and a search result (for example, a search hit or a search not hit) of a search performed using the search condition as a key in place of, or in addition to, the data type or the like described earlier.

<(2-1) C-Snap (Selection)>

The C-snap (selection) is a process of referring to C-metadata 83 associated with S-metadata 82 in the extraction process and selecting data complying with the search condition designated for the designated route (VOL). While the C-snap program 1291 runs in the storage apparatus 300 in the present embodiment, the C-snap program 1291 may run on any of the management computer 100 and the host computer 200 instead.

A start of a C-snap process is instructed by the user. The instruction is received by the C-snap program 1291. For example, an instruction format is as follows.

CSNAP <search key> <target route ID> <copy destination route ID> <option>

In the case of the instruction format described above, the data chunks 81 in a route designated in <target route ID> are narrowed down to data chunks 81 complying with a search key (a search condition) designated in <search key>. One or more pieces of S-metadata 82 that refer to the one or more narrowed-down data chunks 81 are to be duplicated to below the route designated in <copy destination route ID>.

Figure 13:
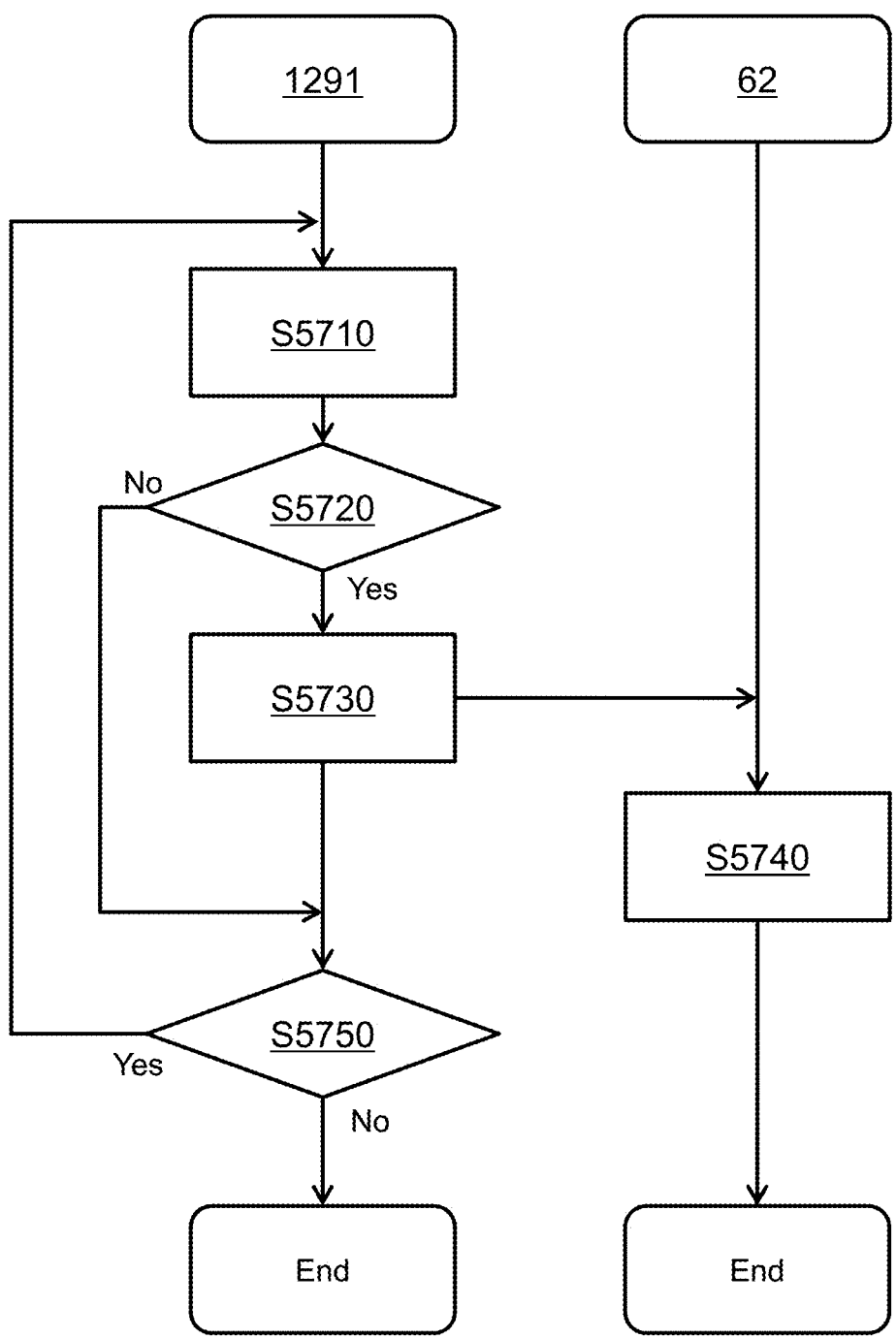
FIG. 13 is a flow chart of a C-snap (selection).

FIG. 13 is a flow chart of the C-snap (selection).

S5710 is performed. Specifically, the C-snap program 1291 specifies, from the storage management table 1250, the S-metadata pointer 1254 corresponding to a route ID designated in the instruction from the user. Next, the C-snap program 1291 refers to the S-metadata management information 1210 from the specified S-metadata pointer 1254, and further specifies C-metadata 83 associated with the S-metadata from the user ID 121011 and the user pointer 121011 in the S-metadata management information 1210.

Next, the C-snap program 1291 determines whether or not the C-metadata 83 (the content information included in the C-metadata 83) complies with the search key designated by the user (S5720).

When a result of the determination in S5720 is true (S5720: Yes), the C-snap program 1291 makes a request to the object program 62 to duplicate the first S-metadata 82S (the S-metadata management information 1210 and the S-metadata attribute information 1220) associated with the C-metadata 83 (S5730). In response to the request, the object program 62 duplicates the designated first S-metadata 82S (S5740). Moreover, in the duplicate, an S-metadata ID that differs from the S-metadata ID of the original first S-metadata 82S may be added as an S-metadata ID of the second S-metadata 82T based on a duplicate of the first S-metadata 82S. In addition, in the duplicate, any of the C-snap program 1291 and the object program 62 may execute a duplicate narrow-down process that is any of (a) and (b) described below.

(a) Skip duplicating S-metadata attribute information 1220 that refers to a data chunk not required for analysis (S-metadata attribute information 1220 of a reference destination of C-metadata 83 not complying with the search key).

(b) Change the data validity 122007 of the S-metadata attribute information 1220 thereof to "NO".

Whether or not such a duplicate narrow-down process is to be executed may be described in the instruction (the start instruction with respect to the C-snap program 1291) from the user. The duplicate narrow-down process enables data chunks 81 included in the SSVOL 26S (VDM) to be narrowed down.

Next, the C-snap program 1291 determines whether or not S5710 has been performed on all pieces of S-metadata 82 corresponding to the route ID designated by the user (S5750). When a result of the determination in S5750 is false (S5750: No), S5710 is performed on pieces of S-metadata 82 yet to be processed. When the result of the determination in S5750 is true (S5750: Yes), the process is ended. When S5740 is performed on at least one piece of S-metadata 82, C-snap (snapshot acquisition) is performed.

<(2-2) C-Snap (Snapshot Acquisition)>

Based on the duplicate of the S-metadata 82 obtained in C-snap (selection), the SSVOL 26S is created. The SSVOL 26S becomes usable as a DM from the host computer 200 when the host computer 200 is provided with the SSVOL 26S.

Figure 14:
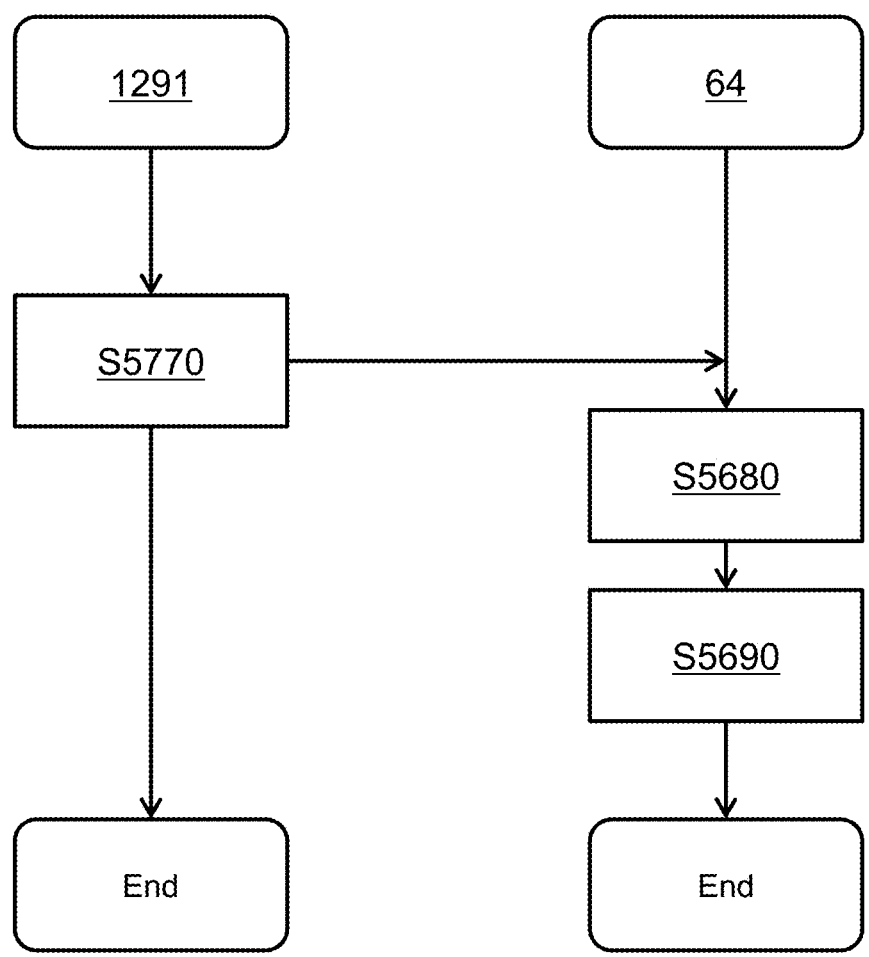
FIG. 14 is a flow chart of a C-snap (snapshot acquisition).

FIG. 14 is a flow chart of the C-snap (snapshot acquisition).

The C-snap program 1291 makes a request to the snapshot program 64 to create a snapshot (S5770). When creating a snapshot, the C-snap program 1291 passes the S-metadata ID in the second S-metadata 82T created in C-snap (selection) to the snapshot program 64.

In response to the request, the snapshot program 64 specifies the S-metadata management information 1210 matching the S-metadata ID passed from the C-snap program 1291 and sets the copy state 122003 of the S-metadata attribute information 1220 associated with the S-metadata management information 1210 to "SVOL" (S5680). Setting the copy state 122003 to "SVOL" causes a determination of snapshot target data to be made during write to the object and a necessary snapshot process (refer to FIG. 4) is performed.

Next, the snapshot program 64 adds a copy destination route ID (an ID of the SSVOL 26S) designated by the user as the route ID 1251 to the storage management table 1250 and associates the pointer 1254 to a duplicate of the S-metadata 82 with the route ID 1251 (S5690). The snapshot program 64 may provide the host computer 200 of the user having issued the C-snap start instruction (the user who is a search request source) with the copy destination route ID (the SSVOL 26S).

As described above, in the C-snap process in the storage apparatus 300, a data chunk that is a snapshot target (a data chunk included in a VDM) is selected based on a search key provided by the user in C-snap (selection), and the SSVOL 26S (VDM) including the selected data chunk is created in C-snap (snapshot acquisition).

Figure 15:
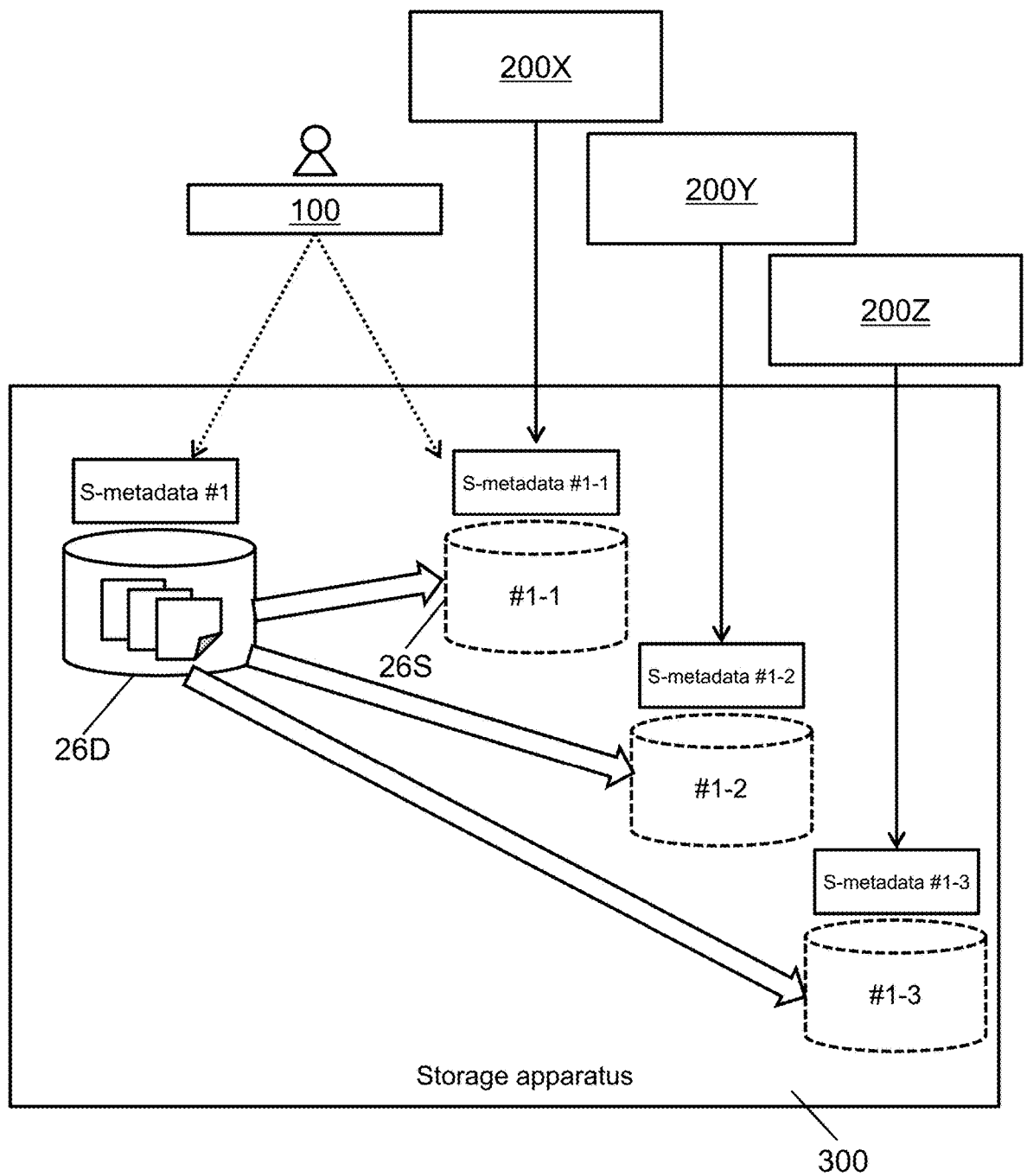
FIG. 15 shows an example of a relationship between one data VOL and a plurality of snapshot VOLs (virtual DMs).

In addition, in principle, a plurality of copy destination route IDs (SSVOLs 26S) can be created with respect to one route ID (one data VOL 26D). Specifically, for example, as exemplified in FIG. 15, a plurality of SSVOLs #1-1 to #1-3 can be created with respect to one data VOL 26D.

Furthermore, when accessing a copy destination route ID designated when creating a C-snap from the host computer 200 after the C-snap process, a DM (the SSVOL 26S) is to appear to exist from the host computer 200. When the SSVOL 26S is created in plurality, for example, DMs (data marts) with different viewpoints are to appear to be created.

Embodiment 2

An embodiment 2 will now be described. In doing so, differences from the embodiment 1 will be mainly described and descriptions of points in common with the embodiment 1 will be either omitted or simplified. This will similarly apply to other embodiments.

Figure 16:
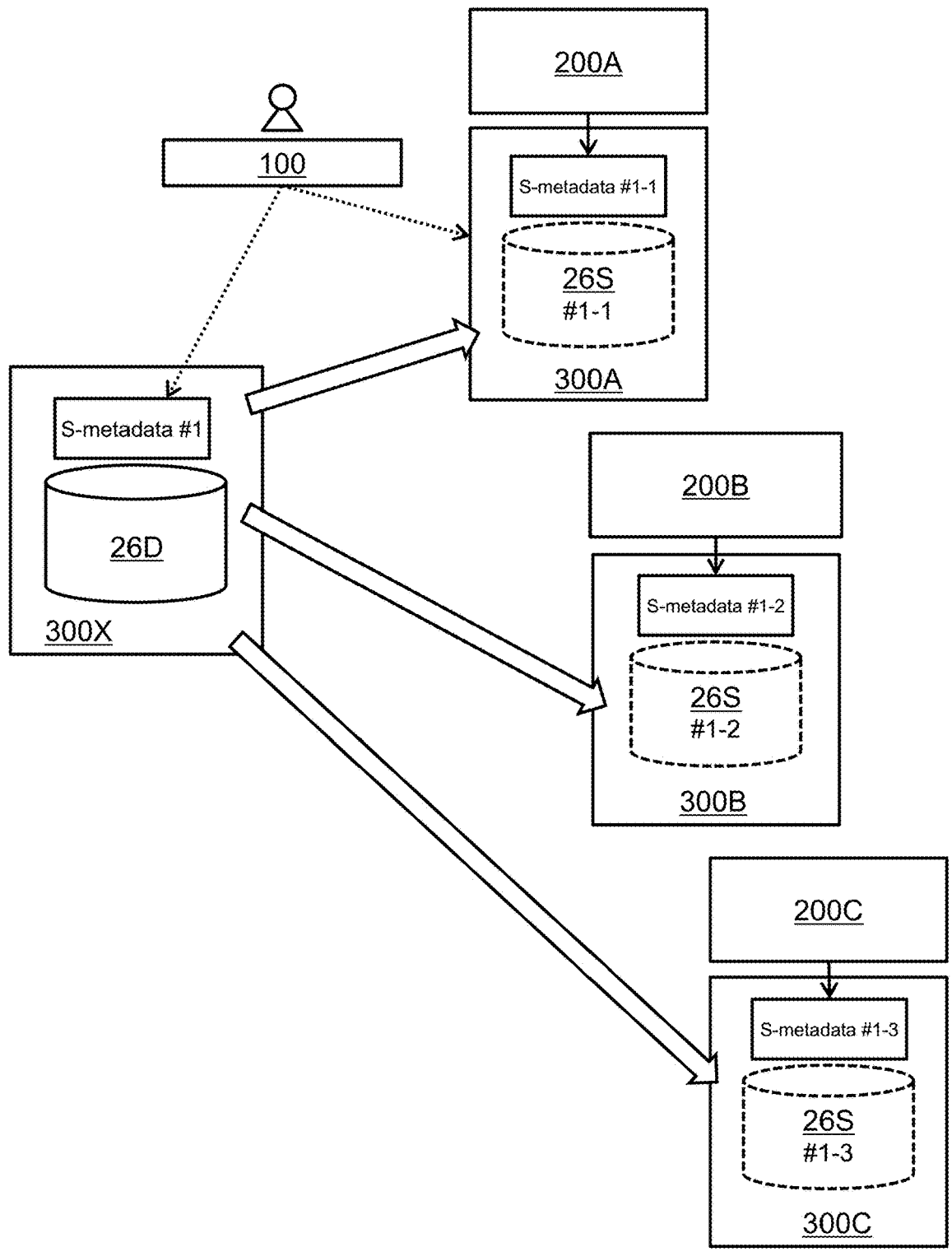
FIG. 16 shows an outline of an embodiment 2.

FIG. 16 shows an outline of the embodiment 2.

A storage system according to the embodiment 2 is constituted by a plurality of storage apparatuses 300X and 300A to 300C. For example, one virtual storage system is constituted by the storage apparatuses 300X and 300A to 300C. In other words, the storage system according to the present embodiment may be a virtual storage system. The number of storage apparatuses 300 is not limited to the example shown in FIG. 16.

The storage apparatus 300X includes the data VOL 26D as a data source. SSVOLs 26S (#1-1 to #1-3) which refer to at least one data chunk in the data VOL 26D are respectively generated in the storage apparatuses 300A to 300C. In other words, a C-snap process is performed across a plurality of storage apparatuses 300. Specifically, for example, when the storage apparatus 300A receives a search request designated a route of the data VOL 26D, the storage apparatus 300A searches, from the storage apparatus 300X, C-metadata 83 complying with the search key designated in the search request, and duplicates first S-metadata 1#1 associated with the found C-metadata 83 to the storage apparatus 300A. The storage apparatus 300A provides the host computer 200A with the SSVOL #1-1 corresponding to a route to which belongs the second S-metadata #1-1 based on the duplicate of the first S-metadata #1.

Figure 17:
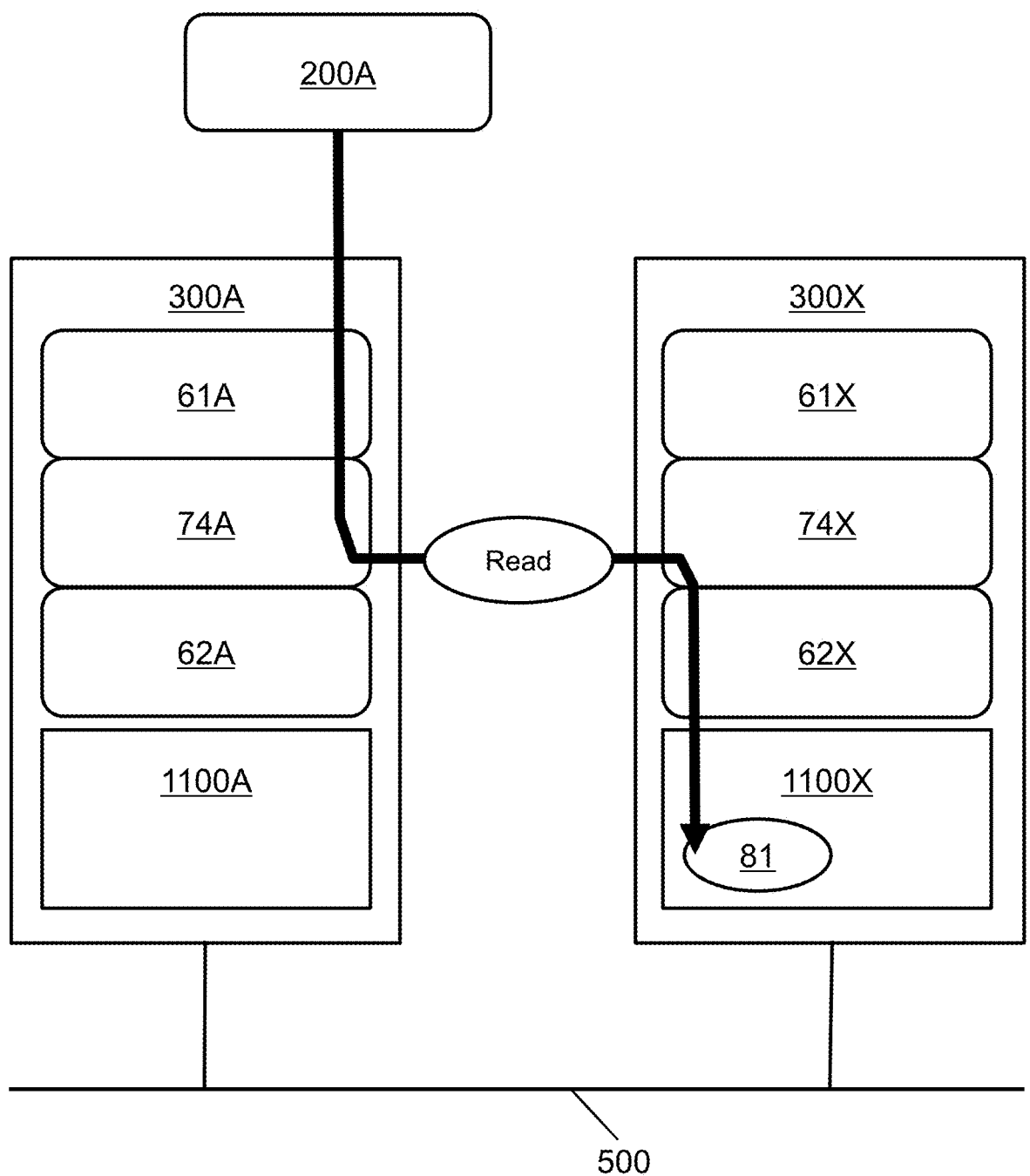
FIG. 17 shows an outline of a scale-out process.

A scale-out process is required to perform a C-snap process between storage apparatuses 300. FIG. 17 shows an outline of the scale-out process. The storage apparatuses 300X and 300A are exemplified in FIG. 17. Scale-out programs 74X and 74A have been respectively added to the storage apparatuses 300X and 300A. For example, the scale-out program 74X (74A) may relay cooperation between an I/O program 61X (61A) and an object program 62X (62A). Cache memories 1100X and 100A respectively exist in the storage apparatuses 300X and 300A.

In this case, when the storage apparatus 300A receives a read request from the host computer 200A, the scale-out program 74A of the storage apparatus 300A determines whether or not the read request is addressed to an own storage apparatus 300A. When a result of the determination is false, the scale-out program 74A transfers the read request to the storage apparatus 300X that is the destination of the read request. The storage apparatus 300X having received the transferred read request reads a data chunk 81 to the cache memory 1100X based on the read request.

For example, the flow chart shown in FIG. 10 differs from the embodiment 1 in processing after S5020. Specifically, for example, the scale-out program 74A acquires a common request and determines whether or not an access destination of the common request is an own storage apparatus 300A. When a result of the determination is false, the scale-out program 74A transfers the common request to the scale-out program 74X of the storage apparatus 300X that is the access destination of the common request. The scale-out program 74X passes the common request to the object program 62X. On the other hand, when the access destination of the common request is the own storage apparatus 300A, the scale-out program 74A passes the common request to the object program 62A of the own storage apparatus 300A.

In addition, for example, the flow chart shown in FIG. 11 differs in processing after S5520. Specifically, for example, the scale-out program 74A acquires a common request and determines whether or not an access destination of the common request is the own storage apparatus 300A. When a result of the determination is false, the scale-out program 74A transfers the common request to the scale-out program 74X of the storage apparatus 300X that is the access destination of the common request. The scale-out program 74X passes the common request to the object program 62X. On the other hand, when the access destination of the common request is the own storage apparatus 300A, the scale-out program 74A passes the common request to the object program 62A of the storage apparatus 300A including the scale-out program 74A.

As described above, according to the embodiment 2, a C-snap process is performed across a plurality of storage apparatuses 300. Accordingly, the storage apparatuses 300X and 300A can be used for different applications by having the storage apparatus 300X store only the data VOL 26D (a data chunk) and having the storage apparatus 300A store only the SSVOL 26S (snapshot data). An analysis performed by the storage apparatus 300B using a DM (the SSVOL #1-2) can be prevented from affecting performance of another storage apparatus 300C.

Embodiment 3

Figure 18:
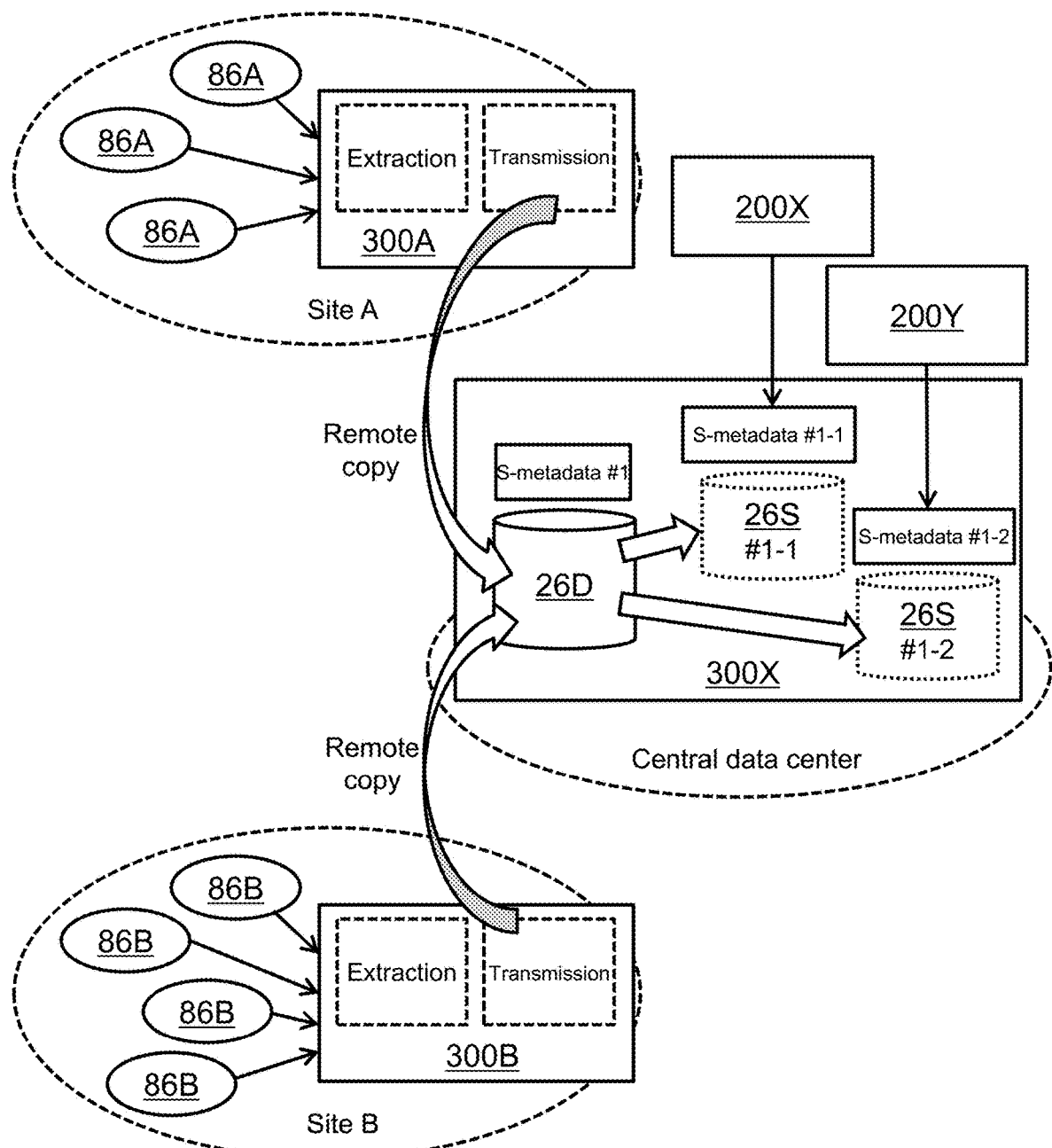
FIG. 18 shows an outline of an embodiment 3.

FIG. 18 shows an outline of an embodiment 3.

A storage system according to the embodiment 3 is constituted by the storage apparatuses 300A and 300B respectively existing at a plurality of sites A and B and the storage apparatus 300X existing at a central data center. The number of sites and the number of storage apparatuses 300 are not limited to the example shown in FIG. 18. In the present embodiment, each of the storage apparatuses 300A and 300B executes an extraction process and the storage apparatus 300X executes a C-snap process.

One or more IoT devices 86A and 82B respectively exist at the sites A and B (IoT: Internet of Things). In this case, an "IoT device" refers to a device capable of exchanging, via a network, a state or control of a sensor included in the device or a state or control of the device itself.

Host computers 200X and Y are capable of accessing the storage apparatus 300X at the central data center.

In the present embodiment, for example, at the site A, the storage apparatus 300A receives sensor information, device state information, and the like of the IoT device 86A via a network. The storage apparatus 300A having received the information stores one or more data chunks including the information in a data VOL (an example of a first unstructured data source) (not shown). The storage apparatus 300A executes an extraction process including a process of creating one or more pieces of C-metadata from the one or more data chunks. In the extraction process, the storage apparatus 300A may delete data not required during an analysis (for example, information which has not been successfully acquired, sensor information including values small enough to be sufficiently negligible, and a stable device state) and may exclude the data from targets of remote copying to be described later.

After the extraction process, the storage apparatus 300A transfers the one or more data chunks and the one or more pieces of C-metadata corresponding to the one or more data chunks to the storage apparatus 300X at the central data center (remote copying).

The storage apparatus 300X having received the data chunks and the pieces of C-metadata stores the data chunks in the data VOL 26D (an example of a second unstructured data source) and stores the C-metadata in the local memory. When the storage apparatus 300X receives a search request designating the data VOL 26D from the host computers 200X and 200Y, the storage apparatus 300X executes a C-snap process. In other words, the storage apparatus 300X generates pieces of second S-metadata #1-1 and #1-2 by duplicating the first S-metadata #1 associated with the C-metadata that complies with the search key, and respectively provides the host computers 200X and 200Y with SSVOLs #1-1 and #1-2 to which the pieces of second S-metadata #1-1 and #1-2 respectively belong.

As described above, according to the embodiment 3, for example, at site A, the storage apparatus 300A receives information of the sensor of the IoT device 86A and the like, the storage apparatus 300A creates C-metadata by extracting content information, and transfers the C-metadata together with a data chunk to the storage apparatus 300X at the central data center. Accordingly, the storage apparatus 300X located at the central data center can avoid performing an extraction process. In other words, in the storage apparatus 300X, a load of an extraction process targeting a large amount of data chunks including information generated from the IoT device 86 can be reduced. In addition, the storage apparatus 300A at a site culls data not considered a target of analysis and subsequently transfers data chunks and C-metadata to the storage apparatus 300X at the central data center. Accordingly, a load of a C-snap process on the storage apparatus 300X and a total amount of data stored by the storage apparatus 300X can be reduced.

Embodiment 4

FIG. 9 shows an outline of an embodiment 4.

An SCM (Storage Class Memory) 943 is adopted. Each of the host computer 200 and the storage apparatus 300 are capable of using the SCM 943, to which a memory area of the host computer 200 and a memory area of the storage apparatus 300 are allocated, as though the SCM 943 is its own memory. Therefore, for example, the C-snap program 1291 can be executed by the host computer 200 and the C-snap program 1291 can find C-metadata complying with a search key from the C-metadata in the SCM 943.

While some embodiments have been described above, it should be obvious that the present invention is not limited to the described embodiments and that various modifications can be made without departing from the spirit and scope of the invention.

For example, any two or more embodiments among the embodiments 1 to 4 can be combined with one another.

In addition, while the embodiments 1 to 4 describe a storage system as an example of a data processing system, a data processing system may correspond to at least one of a storage system, a host system, and a management system. For example, when a host system corresponds to the data processing system, a request source that transmits a search request designating a search key to the host system may be a client system (one or more client computers).

Furthermore, while not only S-metadata 82 but C-metadata 83 also exists in a storage system in the embodiments 1 to 4, the C-metadata 83 may exist in a host system or a management system in place of, or in addition to, the storage system. Specifically, for example, the C-metadata 83 may be created for each user (for example, for each host system or each management system) with respect to a same object (a same data chunk 81), and the C-metadata 83 may be provided to a host system or a management system of a user corresponding to the C-metadata 83. When a host system or a management system receives designation of a search condition from a user, a processor unit in the host system or the management system may search for a piece of C-metadata 83 complying with the search condition among pieces of C-metadata 83 corresponding to the user from the host system or the management system. When the C-metadata 83 is found, the host system or the management system may make a request to the storage system to create an SSVOL to which belongs the S-metadata 82 referred to by the C-metadata 83. The storage system may execute a C-snap process in response to the request.

In addition, the C-metadata 83 may exist for each user. For example, with respect to the same data chunk 81, C-metadata 83 created by the extraction program 1290 of a user A may be stored as C-metadata 83 for the user A and C-metadata 83 created by the extraction program 1290 of a user B may be stored as C-metadata 83 for the user B. When a search request is received from the user A, the storage controller 329 (the C-snap program 1291) may search for C-metadata 83 complying with a search key designated in the search request and with the user A who is a request source. In addition, when the C-snap program 1291 of the user A exists as the C-snap program 1291, the C-snap program 1291 of the user A may search for C-metadata 83 complying with a search key designated in a search request from the user A and with the user A.

Furthermore, a C-snap process may be started upon detection of a C-snap event that is a prescribed event which is defined to start a C-snap process. The C-snap event may be any of a reception of a user request (for example, an explicit request for a C-snap process or a request defined to execute a C-snap process), an arrival of a time point defined in advance (for example, an execution of a C-snap process is started regularly), and a prescribed performance state (a state regarding performance) such as when a load on a processor executing the C-snap program 1291 falls below a prescribed value. For example, the storage controller 329 may receive a user request from at least one of the management computer 100 and the host computer 200 and execute a C-snap process in response to the user request.

In addition, a user program (for example, at least one of the extraction program 1290 and the C-snap program 1291)

may be executed by any of the management computer 100, the host computer 200, and the storage controller 329.

Furthermore, the SSVOL 26S (VDM) may be updated on a regular or irregular basis. For example, the C-snap program 1291 may specify C-metadata 83 representing a same content attribute as a content attribute represented by the C-metadata 83 associated with the second S-metadata 82T belonging to an existing SSVOL 26S, newly create the second S-metadata 82I by duplicating the first S-metadata 82S that is referred to by the C-metadata 83, and newly associate the new second S-metadata 82T with the existing SSVOL 26S.

In addition, a file may be adopted as an example of an object. Data of the file may be an example of a data chunk in the object and metadata of the file may be an example of S-metadata of the object.

Furthermore, a data VOL may be an example of a data area and an SSVOL may be an example of a snapshot that refers to a part of unstructured data in the data area.

In addition, in an extraction process, determination whether or not the first S-metadata 82S complies with a search condition by referring the first S-metadata 82S, may be executed in place of, or in addition to, data extraction from an unstructured data source. When a result of the determination is true, the C-metadata 83 described above may be created based on the first S-metadata 82S and the C-metadata 83 may be associated with the first S-metadata 82S complying with the search condition. Furthermore, in this case, one or more data chunks 81 that are referred to by the first S-metadata 82S complying with the search condition may be an example of corresponding unstructured data.

REFERENCE SIGNS LIST

300 Storage apparatus

The invention claimed is:

1. A data processing system, comprising:
an interface unit constituted by one or more interfaces including an interface for accessing an unstructured data source including unstructured data with which first type metadata is associated; and
a processor unit constituted by one or more processors coupled to the interface unit and configured to execute an extraction process, wherein
the extraction process includes, for each piece of corresponding unstructured data in the unstructured data source:
creating second type metadata being metadata including content information representing one or more content attributes of the piece of unstructured data; and
associating the created second type metadata with first type metadata of the piece of unstructured data;
one or a plurality of pieces of second type metadata are a target of a search in response to a search request including a search condition designated by a user;
the processor unit is configured to specify one or more pieces of first type metadata, with which one or more pieces of second type metadata complying with the search condition are respectively associated;
each of the one or more pieces of specified first type metadata is a piece of first first type metadata being original metadata of unstructured data;
the processor unit is configured to:
for each of one or more pieces of first first type metadata being the one or more pieces of specified first type metadata, create second first type metadata being metadata based on a duplicate of the first type metadata, and
generate a virtual volume, to which the one or more created pieces of second first type metadata belong and which is provided to the user;
the virtual volume provided to the user is a snapshot volume; and
the snapshot volume is a data set of one or more pieces of unstructured data that are referred to by the one or more pieces of second first type metadata among one or a plurality of pieces of unstructured data in the unstructured data source.

2. The data processing system according to claim 1, wherein
the processor unit is configured to generate the virtual volume in response to the search request.

3. The data processing system according to claim 1, wherein
unstructured data being a write target with respect to the virtual volume is stored in an area that differs from an area of an unstructured data source including unstructured data referred to by a first type metadata duplicate belonging to the virtual volume.

4. The data processing system according to claim 1, wherein
the extraction process is a process asynchronous from a process in response to the search request.

5. The data processing system according to claim 1, wherein
at least one of unstructured data extracted in the extraction process and second type metadata created in the extraction process complies with at least one of a user program being a computer program, which is defined by the user and which is executed by the processor unit, and a rule, which is defined by the user and which is referred to by the processor unit.

6. The data processing system according to claim 1, wherein
one or a plurality of pieces of unstructured data stored in the unstructured data source are included in one or more objects,
first type metadata exists for each object, and
the first type metadata duplicate refers only to unstructured data, with which second type metadata complying with the search condition is associated, among the one or more pieces of unstructured data referred to by first type metadata corresponding to the first type metadata duplicate.

7. The data processing system according to claim 1, wherein
the processor unit is configured to create a plurality of pieces of second first type metadata from the same piece of first first type metadata.

8. The data processing system according to claim 1, wherein
the virtual volume is provided from a second apparatus being a separate apparatus from a first apparatus that provides the unstructured data source.

9. The data processing system according to claim 8, comprising
a plurality of storage apparatuses including the interface unit and the processor unit, wherein
each of the first apparatus and the second apparatus is any storage apparatus among the plurality of storage apparatuses.

10. The data processing system according to claim 1, comprising
a plurality of apparatuses including the interface unit and the processor unit, wherein
the plurality of apparatuses include:
one or more first apparatuses each including a first unstructured data source; and
a second apparatus which is coupled to the one or more first apparatuses and which includes a second unstructured data source, each of the one or more first apparatuses is configured to:
store one or a plurality of pieces of unstructured data including information gathered from a plurality of devices in the first unstructured data source included in the first apparatus;
execute the extraction process; and
transmit to the second apparatus second type metadata obtained by the extraction process and unstructured data corresponding to the second type metadata, and
the second apparatus is configured to:
receive second type metadata and unstructured data corresponding to the second type metadata from each of the one or more first apparatuses; and
store the received second type metadata and, store in the second unstructured data source the unstructured data corresponding to the second type metadata.

11. A data processing method, comprising,
for each piece of corresponding unstructured data in an unstructured data source including unstructured data with which first type metadata is associated:
creating second type metadata being metadata including content information representing one or more content attributes of the piece of unstructured data; and
associating the created second type metadata with the first type metadata of the unstructured data;
targeting one or a plurality of pieces of second type metadata in a search in response to a search request including a search condition designated by a user;
specifying one or more pieces of first type metadata, with which one or more pieces of second type metadata complying with the search condition are respectively associated where each of the one or more pieces of specified first type metadata is a piece of first first type metadata being original metadata of unstructured data;
for each of one or more pieces of first first type metadata being the one or more pieces of specified first type metadata, creating second first type metadata being metadata based on a duplicate of the first type metadata;
generating a virtual volume, to which the one or more created pieces of second first type metadata belong and which is provided to the user; and
providing the virtual volume to the user as a snapshot volume where the snapshot volume is a data set of one or more pieces of unstructured data that are referred to by the one or more pieces of second first type metadata among one or a plurality of pieces of unstructured data in the unstructured data source.

12. A non-transitory computer-readable recording medium on which is recorded a computer program causing a computer to,
for each piece of corresponding unstructured data in an unstructured data source including unstructured data with which first type metadata is associated:
create second type metadata being metadata including content information representing one or more content attributes of the piece of unstructured data; and
associate the created second type metadata with the first type metadata of the unstructured data;
target one or a plurality of pieces of second type metadata in a search in response to a search request including a search condition designated by a user;
specify one or more pieces of first type metadata, with which one or more pieces of second type metadata complying with the search condition are respectively associated where each of the one or more pieces of specified first type metadata is a piece of first first type metadata being original metadata of unstructured data;
for each of one or more pieces of first first type metadata being the one or more pieces of specified first type metadata, create second first type metadata being metadata based on a duplicate of the first type metadata;
generate a virtual volume, to which the one or more created pieces of second first type metadata belong and which is provided to the user; and
provide the virtual volume to the user as a snapshot volume where the snapshot volume is a data set of one or more pieces of unstructured data that are referred to by the one or more pieces of second first type metadata among one or a plurality of pieces of unstructured data in the unstructured data source.

* * * * *